(12) United States Patent
Shimura

(10) Patent No.: US 11,437,863 B2
(45) Date of Patent: Sep. 6, 2022

(54) POWER TRANSMISSION APPARATUS, POWER RECEPTION APPARATUS, METHOD FOR CONTROLLING WIRELESS POWER TRANSMISSION SYSTEM, AND STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/211,597

(22) Filed: Mar. 24, 2021

(65) Prior Publication Data

US 2021/0305849 A1 Sep. 30, 2021

(30) Foreign Application Priority Data

Mar. 31, 2020 (JP) .............................. JP2020-063780

(51) Int. Cl.
*H02J 50/60* (2016.01)
*H02J 50/12* (2016.01)
*H02J 50/80* (2016.01)
*H02J 7/02* (2016.01)
*H02J 7/00* (2006.01)
*H02J 50/90* (2016.01)

(52) U.S. Cl.
CPC .............. *H02J 50/60* (2016.02); *H02J 7/007* (2013.01); *H02J 7/02* (2013.01); *H02J 50/12* (2016.02); *H02J 50/80* (2016.02); *H02J 50/90* (2016.02)

(58) Field of Classification Search
CPC .. H02J 50/10; H02J 50/12; H02J 50/60; H02J 50/80; H02J 50/90
See application file for complete search history.

(56) References Cited

U.S. PATENT DOCUMENTS

| 2012/0242285 | A1* | 9/2012 | Jung | ....................... H02J 50/12 |
| | | | | 320/108 |
| 2013/0264887 | A1* | 10/2013 | Arisawa | ............... G01D 5/2006 |
| | | | | 307/104 |
| 2014/0191715 | A1* | 7/2014 | Wechlin | .................. H02J 50/12 |
| | | | | 320/108 |
| 2014/0239735 | A1* | 8/2014 | Abe | ...................... B60L 53/124 |
| | | | | 307/104 |

(Continued)

FOREIGN PATENT DOCUMENTS

| JP | 2015027172 A | 2/2015 |
| JP | 2017070074 A | 4/2017 |

*Primary Examiner* — Levi Gannon
(74) *Attorney, Agent, or Firm* — Canon U.S.A., Inc. I.P. Division

(57) ABSTRACT

A wireless power transmission system wirelessly transmits power from a power transmission apparatus to a power reception apparatus. The system performs detection processing using a first detection method for detecting an object different from the power reception apparatus. The system determines whether a predetermined condition related to a state of at least either one of the power transmission apparatus and the power reception apparatus is satisfied. Then, the system performs object detection processing using a second detection method, different from the first detection method, according to a result of the determination regarding whether the predetermined condition is satisfied.

19 Claims, 11 Drawing Sheets

(56) References Cited

U.S. PATENT DOCUMENTS

| | | | |
|---|---|---|---|
| 2015/0263532 A1* | 9/2015 | Van Wageningen | H02J 50/60 307/104 |
| 2016/0149440 A1* | 5/2016 | Staring | H02J 50/12 307/104 |
| 2016/0218520 A1* | 7/2016 | Mehas | H02J 50/60 |
| 2017/0018977 A1* | 1/2017 | Van Wageningen | H02J 50/10 |
| 2018/0248408 A1* | 8/2018 | Chen | H02J 50/05 |
| 2020/0195051 A1* | 6/2020 | Smith | G01V 3/10 |

* cited by examiner

POWER TRANSMISSION APPARATUS, POWER RECEPTION APPARATUS, METHOD FOR CONTROLLING WIRELESS POWER TRANSMISSION SYSTEM, AND STORAGE MEDIUM

BACKGROUND

Field

The present disclosure relates to a wireless power transmission technique.

Description of the Related Art

In recent years, technical development for a wireless power transmission system has been widely performed. Japanese Patent Application Laid-Open No. 2017-70074 discusses a foreign object detection method conforming to the Wireless Power Consortium (WPC) standard. Japanese Patent Application Laid-Open No. 2015-27172 discusses a foreign object detection method in which a power transmission apparatus transmits a foreign object detection signal to a power reception apparatus and determines the presence or absence of a foreign object by using an echo signal from the power reception apparatus.

The foreign object detection method (Power Loss method) discussed in Japanese Patent Application Laid-Open No. 2017-70074 detects a foreign object different from the power reception apparatus, based on the result of measuring a power loss occurring between the power transmission apparatus and the power reception apparatus during power transmission from the power transmission apparatus to the power reception apparatus. On the other hand, the foreign object detection method discussed in Japanese Patent Application Laid-Open No. 2015-27172 detects a foreign object based on the result of measuring the attenuation state of the signal transmitted by the power transmission apparatus. While there are a number of methods for detecting a foreign object in performing wireless power transmission, a method for suitably controlling detection processing when a plurality of methods is available has not yet been established.

SUMMARY

Various embodiments of the present disclosure provide techniques and mechanisms for suitably controlling detection processing when a plurality of methods for detecting an object different from the power reception apparatus is available in performing wireless power transmission.

According to various embodiments of the present disclosure, a power transmission apparatus includes a power transmission unit configured to wirelessly transmit power to a power reception apparatus, a first detection unit configured to perform detection processing using a first detection method for detecting an object different from the power reception apparatus, based on a power loss related to a power transmission by the power transmission unit, a determination unit configured to determine whether a predetermined condition related to a state of at least either one of the power reception apparatus and the power transmission apparatus is satisfied, and a second detection unit configured to perform detection processing using a second detection method for detecting an object different from the power reception apparatus based on at least either one of a voltage attenuation state and a current attenuation state related to the power transmission by the power transmission unit, according to the determination result by the determination unit.

Further features of various embodiments of the present disclosure will become apparent from the following description of exemplary embodiments with reference to the attached drawings.

DESCRIPTION OF THE EMBODIMENTS

Figure 1:
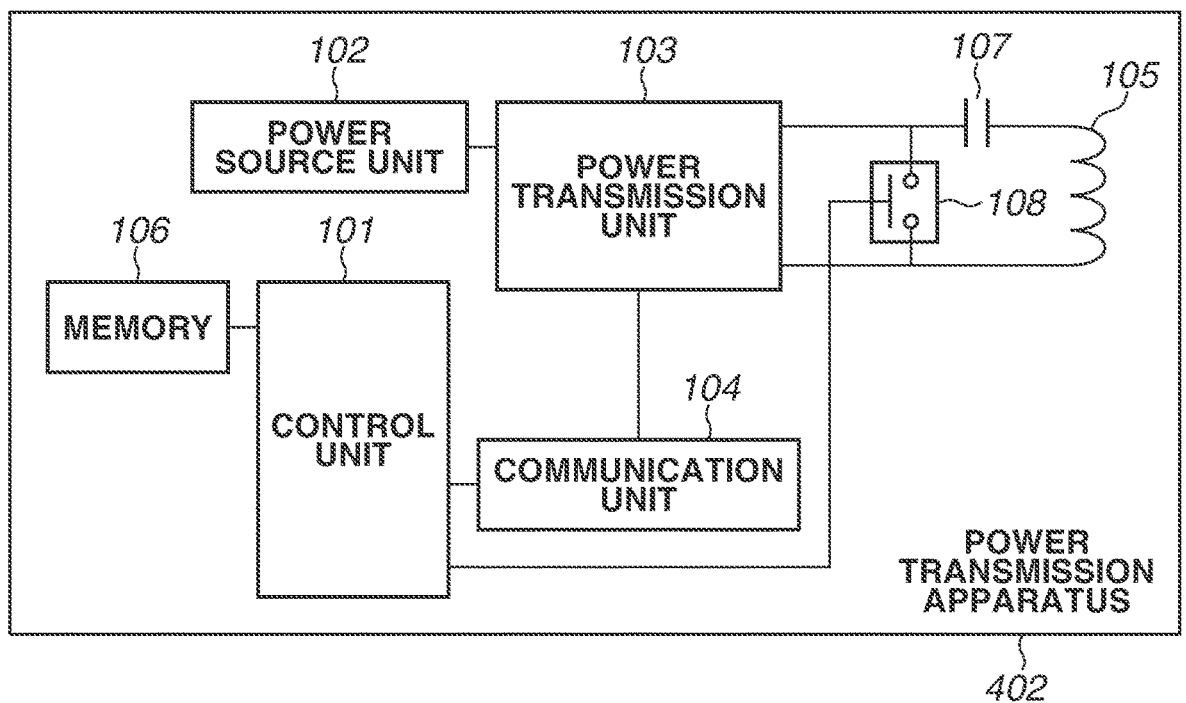
FIG. 1 is a diagram illustrating an example of a configuration of a power transmission apparatus according to one embodiment.

Exemplary embodiments will be described in detail below with reference to the accompanying drawings. Although a plurality of features is described in the exemplary embodiments, not all of the plurality of features is indispensable to the present invention, and the plurality of features may be combined in different ways from those described herein. In the accompanying drawings, identical or similar components are assigned the same reference numerals.

[Configuration of Wireless Power Transmission System]

Figure 4:
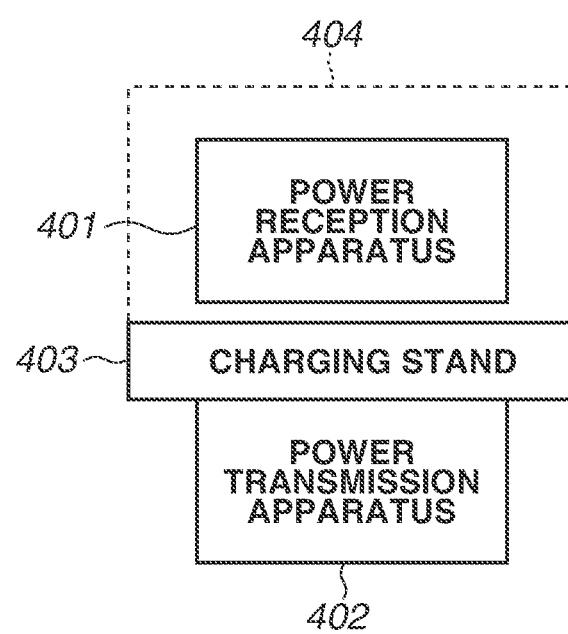
FIG. 4 is a diagram illustrating an example of a configuration of a wireless power transmission system according to one embodiment.

FIG. 4 illustrates an example of a configuration of a wireless power transmission system (wireless recharging system) according to one embodiment of the present disclosure. The system includes, for example, a power reception apparatus 401 and a power transmission apparatus 402. The configurations of the power reception apparatus 401 and the power transmission apparatus 402 will be described in detail below with reference to FIGS. 2 and 1, respectively. In the following descriptions, the power reception apparatus 401 may be referred to as the RX and the power transmission apparatus 402 may be referred to as the TX. The RX is an electronic apparatus that receives power from the TX to charge the built-in battery. The TX is an electronic apparatus that wirelessly transmits power to the RX placed on a charging stand 403 as a part of the TX. Since the charging stand 403 is a part of the TX, hereinafter, "being placed on the charging stand 403" may be referred to as "being placed on the TX (power transmission apparatus 402)". A range 404 enclosed in dotted lines is a range where the RX can receive power from the TX. The RX and the TX can have a function of executing applications other than a wireless charging application. A smart phone is an example of the RX, and an accessory device for charging the smart phone is an example of the TX. The RX and the TX may each be a tablet computer, a storage device (such as a hard disk drive and a memory device), or an information processing apparatus such as a personal computer (PC). For example, the RX and the TX may each be an imaging apparatus (such as a still camera and a video camera), an automobile, a robot, a medical instrument, or a printer.

The present system performs wireless power transmission using an electromagnetic induction method for wireless charging conforming to the WPC standard. More specifically, the RX and the TX perform the wireless power transmission for wireless charging conforming to the WPC standard between a power reception antenna 205 of the RX and a power transmission antenna 105 of the TX. The wireless power transmission method to be applied to the present system is not limited to a method prescribed in the WPC standard but may be other methods based on electromagnetic induction, magnetic field resonance, electric field resonance, microwaves, or laser, for example. Although, in the present exemplary embodiment, the wireless power transmission is used for wireless charging, the wireless power transmission may be performed for purposes other than wireless charging.

The WPC standard prescribes the magnitude of power guaranteed to be received by the power reception apparatus 401 when the power reception apparatus 401 receives power from the power transmission apparatus 402, based on a value called guaranteed power (hereinafter referred to as "GP"). The GP indicates a guaranteed power value for an output to the loads of the power reception apparatus 401 (e.g., the charging circuit and the battery) even if the power transmission efficiency between the power reception antenna 205 and the power transmission antenna 105 decreases, for example, by a variation of the positional relation between the power reception apparatus 401 and the power transmission apparatus 402. In an example case where the GP is 5 watts (W), even if the power transmission efficiency decreases by a variation of the positional relation between the power reception antenna 205 and the power transmission antenna 105, the power transmission apparatus 402 controls the power transmission to enable outputting at least 5 W to the loads in the power reception apparatus 401.

If a foreign object different from the power reception apparatus 401 is present in the vicinity of the power transmission apparatus 402 when the power transmission apparatus 402 transmits power to the power reception apparatus 401, the electromagnetic wave for the power transmission may affect the foreign object, and the temperature of the foreign object can rise or the foreign object can be damaged. The WPC standard prescribes a method for detecting a foreign object on the charging stand 403 of the power transmission apparatus 402, by the power transmission apparatus 402, to prevent a temperature rise and damage to the foreign object due to suspension of the power transmission. More specifically, the WPC standard prescribes the Power Loss (power loss) method for detecting a foreign object based on the difference between the transmission power level of power transmitted by the power transmission apparatus 402 and the reception power level of power received by the power reception apparatus 401. The WPC standard also prescribes the Q value measurement method for detecting a foreign object based on the variation of the quality factor (Q value) of the power transmission antenna 105 (power transmission coil) of the power transmission apparatus 402. Note that foreign objects that are detected by the power transmission apparatus 402 according to the present exemplary embodiment are not limited to objects existing on the charging stand 403. The power transmission apparatus 402 detect a foreign object in the vicinity of the power transmission apparatus 402 and may be able to detect a foreign object located within a range where the power transmission apparatus 402 can perform the power transmission.

Figure 10:
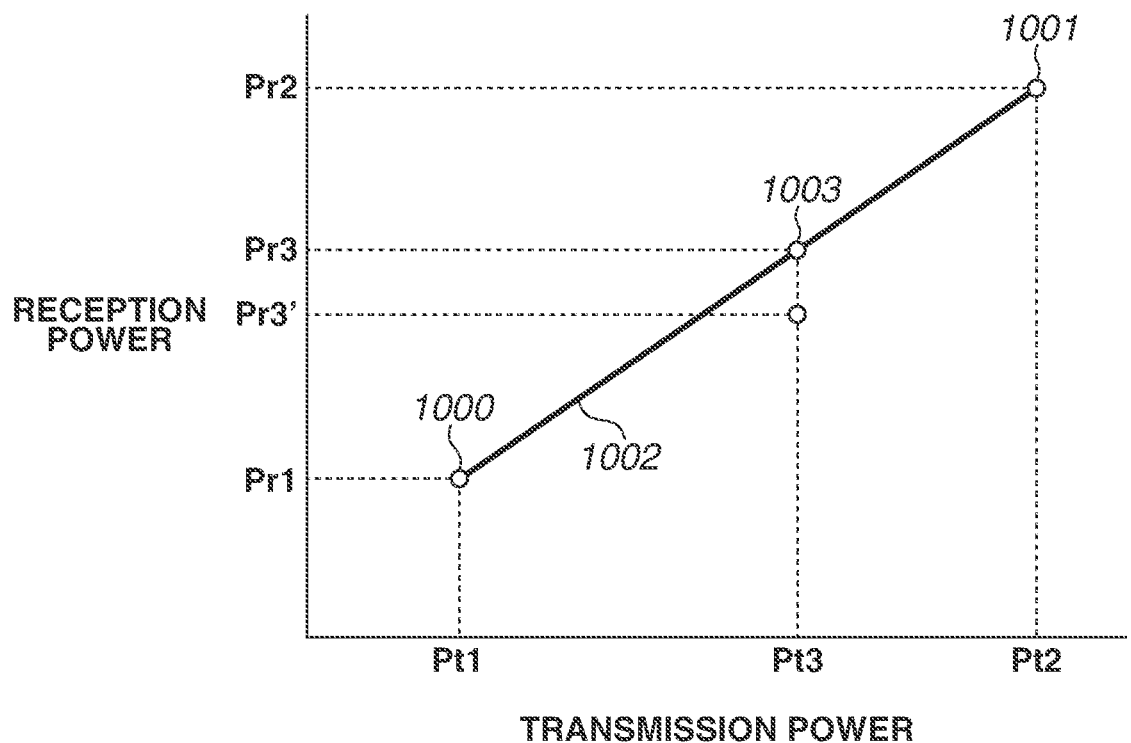
FIG. 10 is a diagram illustrating a method for setting a threshold value in foreign object detection based on a Power Loss method according to one embodiment.

The foreign object detection based on the Power Loss method prescribed by the WPC standard will be described below with reference to FIG. 10. Referring to FIG. 10, the horizontal axis represents the transmission power level of the power transmitted by the power transmission apparatus 402, and the vertical axis represents the reception power level of the power received by the power reception apparatus 401. A foreign object refers to an object, other than the power reception apparatus 401, which affects the power transmission from the power transmission apparatus 402 to the power reception apparatus 401. Examples of such objects include metal pieces having conductivity.

The power transmission apparatus 402 transmits power of a first transmission power value Pt1 to the power reception apparatus 401. The power reception apparatus 401 receives power of a first reception power value Pr1 (this state is referred to as the Light Load state). Then, the power transmission apparatus 402 stores the first transmission power value Pt1. The first transmission power value Pt1 and the first reception power value Pr1 are predetermined minimum transmission power and minimum reception power, respectively. In this operation, the power reception apparatus 401 controls the loads to receive minimize power. For example, the power reception apparatus 401 may disconnect the loads from the power reception antenna 205 to prevent the received power being supplied to the loads (charging circuit and the battery). Subsequently, the power reception apparatus 401 notifies the power transmission apparatus 402 of the first reception power value Pr1. Upon reception of the first reception power value Pr1 from the power reception apparatus 401, the power transmission apparatus 402 calculates the power loss Pt1−Pr1 (=Ploss1) between the power transmitted by the power transmission apparatus 402 and the power received by the power reception apparatus 401, whereby a calibration point 1000 indicating the correspondence between the first transmission power value Pt1 and the first reception power value Pr1 can be generated.

Subsequently, the power transmission apparatus 402 changes the transmission power value to a second transmission power value Pt2 and transmits power to the power reception apparatus 401. The power reception apparatus 401 receives power of a second reception power value Pr2 (this state is referred to as the Connected Load state). Then, the power transmission apparatus 402 stores the second transmission power value Pt2. The second transmission power value Pt2 and the second reception power value Pr2 are predetermined maximal transmission power and maximum reception power, respectively. In this operation, the power reception apparatus 401 controls the loads to receive the maximal power. For example, the power reception apparatus 401 connects the power reception antenna 205 with the loads to supply the received power to the loads. Subsequently, the power reception apparatus 401 notifies the power transmission apparatus 402 of the second reception power value Pr2. Upon reception of the second reception power value Pr2 from the power reception apparatus 401, the power transmission apparatus 402 calculates the power loss Pt2−Pr2 (=Ploss2) between the power transmission apparatus 402 and the power reception apparatus 401, whereby a calibration point 1001 indicating the correspondence between the second transmission power value Pt2 and the second reception power value Pr2 can be generated.

Then, the power transmission apparatus 402 generates a straight line 1002 for linearly interpolating between the calibration points 1000 and 1001. The straight line 1002 indicates a relation between the transmission power and the reception power in a state where no foreign object exists in the vicinity of the power transmission apparatus 402 and the power reception apparatus 401. The straight line 1002 enables the power transmission apparatus 402 to estimate the power value received by the power reception apparatus 401 when the power transmission apparatus 402 transmits a predetermined transmission power in a state where no foreign object exists. For example, when the power transmission apparatus 402 transmits power of a third transmission power value Pt3, it can be estimated that the power reception apparatus 401 will receive power of a third reception power value Pr3 based on a point 1003 corresponding to the third transmission power value Pt3 on the straight line 1002.

As described above, it is possible to obtain the power loss between the power transmission apparatus 402 and the power reception apparatus 401 according to the loads based on a plurality of combinations of the transmission power value of the power transmission apparatus 402 and the reception power value of the power reception apparatus 401. In addition, the interpolation based on the plurality of combinations of the transmission power value and the reception power value enables estimating the power loss between the power transmission apparatus 402 and the power reception apparatus 401 according to all of the loads. Thus, the calibration processing performed by the power transmission apparatus 402 and the power reception apparatus 401 to enable the power transmission apparatus 402 to acquire a combination of the transmission power value and the reception power value is referred to as "calibration processing (CAL processing) based on Power Loss method".

The following is an example case where the power transmission apparatus 402 transmits power of the third transmission power value Pt3 to the power reception apparatus 401 after calibration, and the power transmission apparatus 402 receives a reception power value Pr3'. The power transmission apparatus 402 calculates a value Pr3−Pr3' (=Ploss_FO) by subtracting the reception power value Pr3' actually received from the power reception apparatus 401 from the third reception power value Pr3 in a state where no foreign object exists. When a foreign object exists in the vicinity of the power transmission apparatus 402 and the power reception apparatus 401, the value Ploss_FO can be considered as a power loss of power consumed by the foreign object. This makes it possible to determine that a foreign object exists, in a case where the power Ploss_FO that may have been consumed by the foreign object is larger than a predetermined threshold value. Alternatively, the power transmission apparatus 402 preacquires a power loss Pt3−Pr3 (=Ploss3) between the power transmission apparatus 402 and the power reception apparatus 401 based on the third reception power value Pr3 in a state where no foreign object exists. Then, based on the reception power value Pr3' received from the power reception apparatus 401 in a state where a foreign object exists, the power transmission apparatus 402 acquires a power loss Pt3−Pr3' (=Ploss3') between the power transmission apparatus 402 and the power reception apparatus 401. By using Ploss3'−Ploss3 (=Ploss_FO), the power transmission apparatus 402 may estimate power Ploss_FO that may have been consumed by the foreign object.

As described above, the power Ploss_FO that may have been consumed by the foreign object may be acquired as Pr3−Pr3' (=Ploss_FO) or Ploss3'−Ploss3 (=Ploss_FO). While, in the following descriptions according to the present specification, Ploss_FO is basically acquired as Ploss3'−Ploss3 (=Ploss_FO), the present exemplary embodiment is also applicable to a method for acquiring Ploss_FO as Pr3−Pr3' (=Ploss_FO). This completes the description of the foreign object detection based on the Power Loss method.

The foreign object detection based on the Power Loss method is performed during the power transmission (power transfer phase to be described below) based on data obtained in the calibration phase (described below). The foreign object detection based on the Q value measurement method is performed before the power transmission (in a negotiation phase or a renegotiation phase before digital ping transmission to be described below).

The RX and the TX according to the present exemplary embodiment perform communication for power transmission and reception control conforming to the WPC standard. The WPC standard prescribes a plurality of phases including the power transfer phase in which the power transmission is performed and one or more phases before the actual power transmission. Communication for required power transmission and reception control is performed in each phase. The phases before the power transmission can include a selection phase, a ping phase, an identification and configuration phase, a negotiation phase, and a calibration phase. Hereinafter, the identification and configuration phase is also referred to as I&C phase. Processing in each phase will be described below.

In the selection phase, the TX intermittently transmits an analog ping and detects that an object is placed on the charging stand 403 of the TX (for example, the RX or a conductor piece is placed on the charging stand 403). The TX detects at least either one of the voltage and the current values of the power transmission antenna 105 when an analog ping is transmitted. When the voltage value is smaller than a threshold value or the current value is larger than a threshold value, the TX determines that an object exists and enters the ping phase.

In the ping phase, the TX transmits a digital ping having larger power than the analog ping. The power of the digital ping is sufficient in magnitude to activate the control unit of the RX placed on the TX. The RX notifies the TX of the magnitude of the reception voltage. In this way, upon reception of a response from the RX that has received the digital ping of the TX, the TX recognizes that the object detected in the selection phase is the RX. Upon reception of the notification of the reception voltage value, the TX enters the I&C phase. The TX measures the Q value (Q Factor) of the power transmission antenna 105 before transmitting a digital ping. The result of this measurement is used when foreign object detection processing based on the Q value measurement method is performed.

In the I&C phase, the TX identifies the RX and acquires device configuration information (capability information) from the RX. The RX transmits an ID packet and a configuration packet. The ID packet includes identifier information on the RX, and configuration packet includes the device configuration information (capability information) on the RX. Upon reception of the ID packet and the configuration packet, the TX transmits an acknowledge (ACK) as a response. Then, the I&C phase ends.

In the negotiation phase, the GP value is determined based on the GP value and the power transmission capability of the TX requested by the RX. the TX performs the foreign object detection processing based on the Q value measurement method in response to a request from the RX. The WPC standard prescribes a method for performing similar processing to the negotiation phase again by the request of the RX after once entering the power transfer phase. A phase entered from the power transfer phase, in which these pieces of processing are performed, is referred to as the renegotiation phase.

In the calibration phase, calibration is performed based on the WPC standard. The RX notifies the TX of a predetermined reception power value (the reception power value in a light load state or the reception power value in the maximum load state). Then, the TX performs adjustment for efficiently performing the power transmission. The reception power value notified to the TX can be used for the foreign object detection processing based on the Power Loss method.

The power transfer phase controls the start and continuation of the power transmission, and the stop of the power transmission if an error or full charge occurs. In communication, the TX and the RX superimpose a signal on an electromagnetic wave transmitted from the power transmission antenna 105 or the power reception antenna 205 by using the power transmission antenna 105 and the power reception antenna 205 that are used to perform the wireless power transmission conforming to the WPC standard. The communication available range conforming to the WPC standard between the TX and the RX is almost similar to the power transmission limit range of the TX.

[Configurations of Power Transmission Apparatus 402 and Power Reception Apparatus 401]

Configurations of the power transmission apparatus 402 (TX) and the power reception apparatus 401 (RX) according to the present exemplary embodiment will be described below. The configurations described below are to be considered only as illustrative, and a part (or whole in some cases) of the illustrated configurations may be replaced with other configurations performing other similar functions, or omitted. Additional configurations may be added to the illustrated configurations. One block to be described below may be divided into a plurality of blocks, and a plurality of block may be integrated into one block. Although the function of each of the following function blocks is implemented as a software program, a part or whole of functions included in these function block may be implemented by hardware.

FIG. 1 is a function block illustrating an example of a configuration of the power transmission apparatus 402 (TX) according to the present exemplary embodiment. The TX includes a control unit 101, a power source unit 102, a power transmission unit 103, a communication unit 104, the power transmission antenna 105, a resonant capacitor 107, and a switch 108. Referring to FIG. 1, the control unit 101, the power source unit 102, the power transmission unit 103, the communication unit 104, and the memory 106 are illustrated as separate units. A plurality of function blocks of these may be implemented in the same chip.

The control unit 101 controls the entire TX, for example, by executing a control program stored in the memory 106. The control unit 101 performs power transmission control including communication for device authentication in the TX. The control unit 101 may control the execution of applications other than the wireless power transmission. The control unit 101 includes, for example, one or more processors such as a central processing unit (CPU) and a microprocessor unit (MPU). The control unit 101 may be composed of a hardware component, such as an Application Specific Integrated Circuit (ASIC). The control unit 101 may include an array circuit, such as a Field Programmable Gate Array (FPGA), that is compiled to perform predetermined processing. The control unit 101 stores information to be stored during execution of various processing, in the memory 106. The control unit 101 can measure time by using a timer (not illustrated).

The power source unit 102 supplies power to each function block. The power source unit 102 is, for example, a commercial power supply or battery. Power supplied from a commercial power supply is accumulated in the battery.

The power transmission unit 103 converts alternating current (AC) or direct current (DC) power input from the power source unit 102 into AC power in a frequency band that is used for the wireless power transmission, and inputs the AC power to the power transmission antenna 105 to generate an electromagnetic wave to be received by the RX. For example, the power transmission unit 103 converts the DC voltage supplied by the power source unit 102 into an AC voltage via a switching circuit having a half- or full-bridge configuration using field effect transistors (FETs). In this case, the power transmission unit 103 includes a gate driver for controlling the ON/OFF state of the FET.

The power transmission unit 103 controls intensity of an electromagnetic wave to be output, by adjusting the voltage (power transmission voltage), the current (power transmission current), or both to be input to the power transmission antenna 105. The electromagnetic wave intensity increases with increasing power transmission voltage or power transmission current, and decreases with decreasing power transmission voltage or power transmission current. The power transmission unit 103 controls the output of AC power to start or stop the power transmission from the power transmission antenna 105, based on an instruction of the control unit 101. In the present exemplary embodiment, the power transmission unit 103 is capable of supplying power sufficient to output 15 W power to the charging unit 206 of the power reception apparatus 401 (RX) conforming to the WPC standard.

The communication unit 104 communicate with the RX to perform the above-described power transmission control conforming to the WPC standard. The communication unit 104 modulates an electromagnetic wave output from the power transmission antenna 105 and transmits information to the RX to perform communication. The communication unit 104 demodulates an electromagnetic wave received from the power transmission antenna 105 modulated by the RX to acquire information transmitted by the RX. More specifically, in the communication performed by the communication unit 104, a signal is superimposed on an electromagnetic wave received from the power transmission antenna 105. The communication unit 104 may communicate with the RX in communication conforming to a standard different from the WPC standard by using an antenna different from the power transmission antenna 105, or communicate with the RX by selectively using a plurality of communications.

The memory 106 can store not only control programs but also the statuses (transmission and reception power values) of the TX and the RX. For example, the status of the TX may be acquired by the control unit 101, the status of the RX may be acquired by a control unit 201 of the RX and received by the TX via the communication unit 104.

The switch 108 is controlled by the control unit 101. The power transmission antenna 105 is connected to the resonant capacitor 107. When the switch 108 turns ON to make a short-circuit, the power transmission antenna 105 and the resonant capacitor 107 form a series resonant circuit that resonates at a specific frequency f1 At this timing, a current flows in the closed circuit formed of the power transmission antenna 105, the resonant capacitor 107, and the switch 108. When the switch 108 turns OFF to make an open circuit, the power transmission antenna 105 and the resonant capacitor 107 are supplied with power from the power transmission unit 103.

Figure 2:
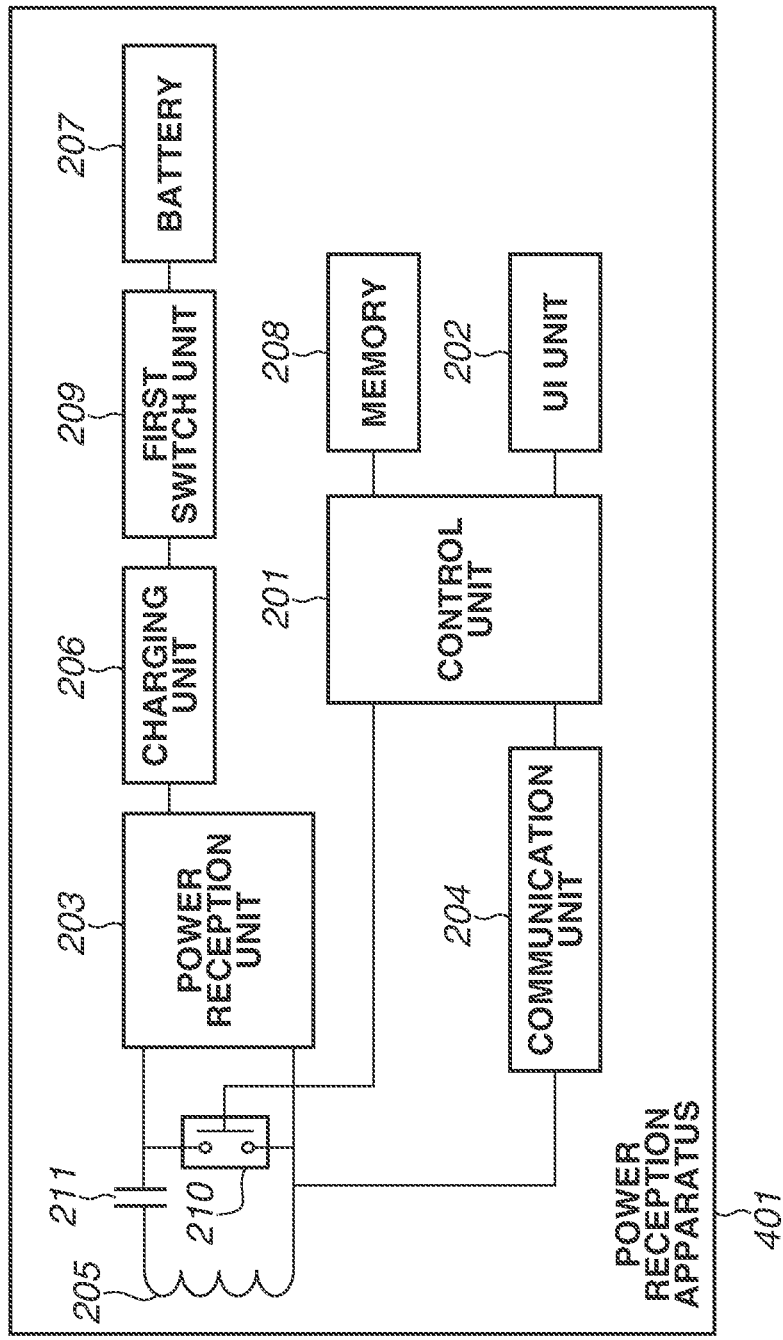
FIG. 2 is a diagram illustrating an example of a configuration of a power reception apparatus according to one embodiment.

FIG. 2 is a block diagram illustrating an example of a configuration of the power reception apparatus 401 (RX) according to the present exemplary embodiment. The RX includes the control unit 201, a user interface (UI) unit 202, a power reception unit 203, a communication unit 204, the power reception antenna 205, the charging unit 206, a battery 207, a memory 208, a first switch unit 209, a second switch unit 210, and a resonant capacitor 211. A plurality of function blocks illustrated in FIG. 2 may be implemented as a hardware module.

The control unit 201 controls the entire RX by, for example, executing a control program stored in the memory 208. More specifically, the control unit 201 controls each function unit illustrated in FIG. 2. The control unit 201 may control the execution of applications other than the wireless power transmission. An example of the control unit 201 includes one or more processor, such as a CPU and MPU. The control unit 201 may control the entire RX (when the RX is a smart phone, the entire RX indicates the entire smart phone) in collaboration with an operating system (OS) executed by the control unit 201.

The control unit 201 may be composed of a hardware component such as an ASIC. The control unit 201 may include an array circuit, such as a FPGA, that is compiled to perform predetermined processing. The control unit 201 stores information that is to be stored during execution of various processing, in the memory 208. The control unit 201 can measure time by using a timer (not illustrated).

The UI unit 202 performs various output operations to the user. Various output operations include screen display, blinking and color change of a light emitting diode (LED), audio output from a speaker, and vibration of the RX main body. The UI unit 202 is implemented by a liquid crystal panel, a speaker, and a vibration motor, for example.

The power reception unit 203 acquires, via the power reception antenna 205, AC power (AC voltage and AC current) generated by the electromagnetic induction based on an electromagnetic wave emitted from the power transmission antenna 105 of the TX. Then, the power reception unit 203 converts AC power into a DC power or an AC power with a predetermined frequency, and outputs power to the charging unit 206 that performs processing for charging the battery 207. More specifically, the power reception unit 203 includes a rectification unit and a voltage control unit that are used for supplying power to the loads of the RX. The above-described GP is the amount of power that is guaranteed for output from the power reception unit 203. In the present exemplary embodiment, the power reception unit 203 is assumed to be capable of supplying power necessary for the charging unit 206 to charge the battery 207, more specifically, capable of supplying 15 W power to the charging unit 206.

The communication unit 204 performs communication for power reception control conforming to the WPC standard with the communication unit 104 of the TX. The communication unit 204 demodulates an electromagnetic wave input from the power reception antenna 205 to acquire information transmitted from the TX. Then, by load-modulating the input electromagnetic wave, the communication unit 204 superimposes a signal related to information to be transmitted to the TX on the electromagnetic wave, thus communicating with the TX. The communication unit 204 may communicate with the TX in conformance with a standard different from the WPC standard, using an antenna different from the power reception antenna 205, or communicate with the TX by selectively using a plurality of communications.

The memory 208 stores not only control programs but also the statuses of the TX and the RX. For example, the status of the RX may be acquired by the control unit 201, and the status of the TX may be acquired by the control unit 101 of the TX and received by the RX via the communication unit 204.

The first switch unit 209 and the second switch unit 210 are controlled by the control unit 201. The power reception antenna 205 is connected to the resonant capacitor 211. When the second switch unit 210 turns ON to make a short-circuit, the power reception antenna 205 and the resonant capacitor 211 form a series resonant circuit that resonates at a specific frequency f2. At this timing, a current flows in the closed circuit formed of the power reception antenna 205, the resonant capacitor 211, and the second switch unit 210, and no current flows in the power reception unit 203. When the second switch unit 210 turns OFF to make an open circuit, the power received by the power reception antenna 205 and the resonant capacitor 211 is supplied to the power reception unit 203.

The first switch unit 209 controls whether to supply the received power to the battery 207 as a load. The first switch unit 209 is also provided with a function of controlling the load value. When the first switch unit 209 connects between the charging unit 206 and the battery 207, the received power is supplied to the battery 207. When the first switch unit 209 disconnects the connection between the charging unit 206 and the battery 207, the received power is not supplied to the battery 207. While, in FIG. 2, the first switch unit 209 is disposed between the charging unit 206 and the battery 207, it may be disposed between the power reception unit 203 and the charging unit 206. Alternatively, the first switch unit 209 may be disposed between the closed circuit (formed of the power reception antenna 205, the resonant capacitor 211, and the second switch unit 210) and the power reception unit 203. More specifically, the first switch unit 209 may be used to control whether to supply the received power to the power reception unit 203. While, in FIG. 2, the first switch unit 209 is illustrated as a block, the first switch unit 209 can also be implemented as a part of the charging unit 206 or a part of the power reception unit 203.

Figure 3:
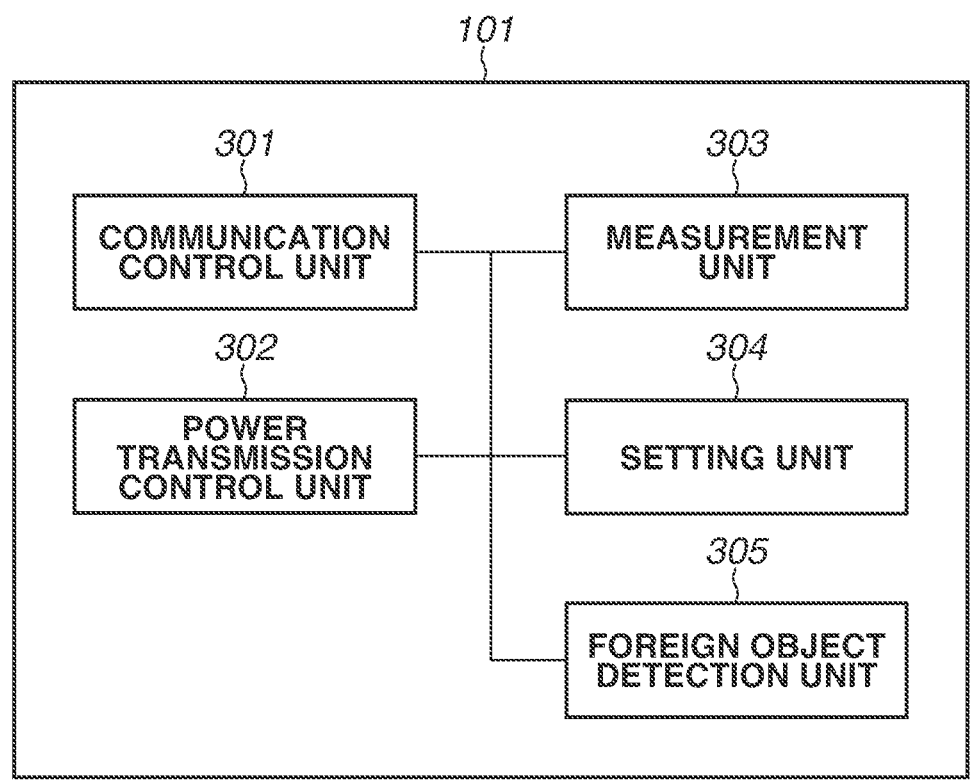
FIG. 3 is a block diagram illustrating an example of a function configuration of a control unit of the power transmission apparatus according to one embodiment.

The function of the control unit 101 of the TX will be described below with reference to FIG. 3. FIG. 3 is a block diagram illustrating an example of a function configuration of the control unit 101 of the power transmission apparatus 402 (TX). The control unit 101 includes a communication control unit 301, a power transmission control unit 302, a measurement unit 303, a setting unit 304, and a foreign object detection unit 305. The communication control unit 301 controls communication with the RX conforming to the WPC standard via the communication unit 104. The power transmission control unit 302 controls the power transmission unit 103 to control the power transmission to the RX. The measurement unit 303 measures a waveform attenuation index (described below). The measurement unit 303 also measures power to be transmitted to the RX via the power transmission unit 103 and measures average transmission power for each unit time. The measurement unit 303 also measures the Q value of the power transmission antenna 105. The setting unit 304 sets a threshold value to be used for the foreign object detection, for example, by calculation processing based on the waveform attenuation index measured by the measurement unit 303.

The foreign object detection unit 305 can implement a foreign object detection function based on the Power Loss method, a foreign object detection function based on the Q value measurement method, and a foreign object detection function based on the waveform attenuation method. The foreign object detection unit 305 may be provided with a function of performing the foreign object detection by using other techniques. For example, in the TX having the Near Field Communication (NFC) function, the foreign object detection unit 305 may perform the foreign object detection by using an opposed apparatus detection function conforming to the NFC standard. The foreign object detection unit 305 can also detect that the status of the TX has changed as a function of a factor other than detecting a foreign object. For example, the TX can also detect an increase or decrease in the number of power reception apparatuses 401 on the TX. The setting unit 304 sets threshold values to be used by the TX as references for determining presence or absence of a foreign object when performing the foreign object detection based on the Power Loss method, the Q value measurement method, and the waveform attenuation method. The setting unit 304 may be provided with a function of setting threshold values as references for determining presence or absence of a foreign object. This function is required to perform the foreign object detection processing by using other techniques. The foreign object detection unit 305 can perform the foreign object detection based on the threshold values set by the setting unit 304, and the waveform attenuation index, the transmission power, and the Q value measured by the measurement unit 303.

Functions of the communication control unit 301, the power transmission control unit 302, the measurement unit 303, the setting unit 304, and the foreign object detection unit 305 are implemented as programs operating in the control unit 101. These processing units are configured as independent programs and are able to operate in parallel while maintaining the synchronization between programs through event processing. However, two or more of these processing units may be incorporated in a program.

[Flow of Processing for Power Transmission Conforming to WPC Standard]

Figure 5:
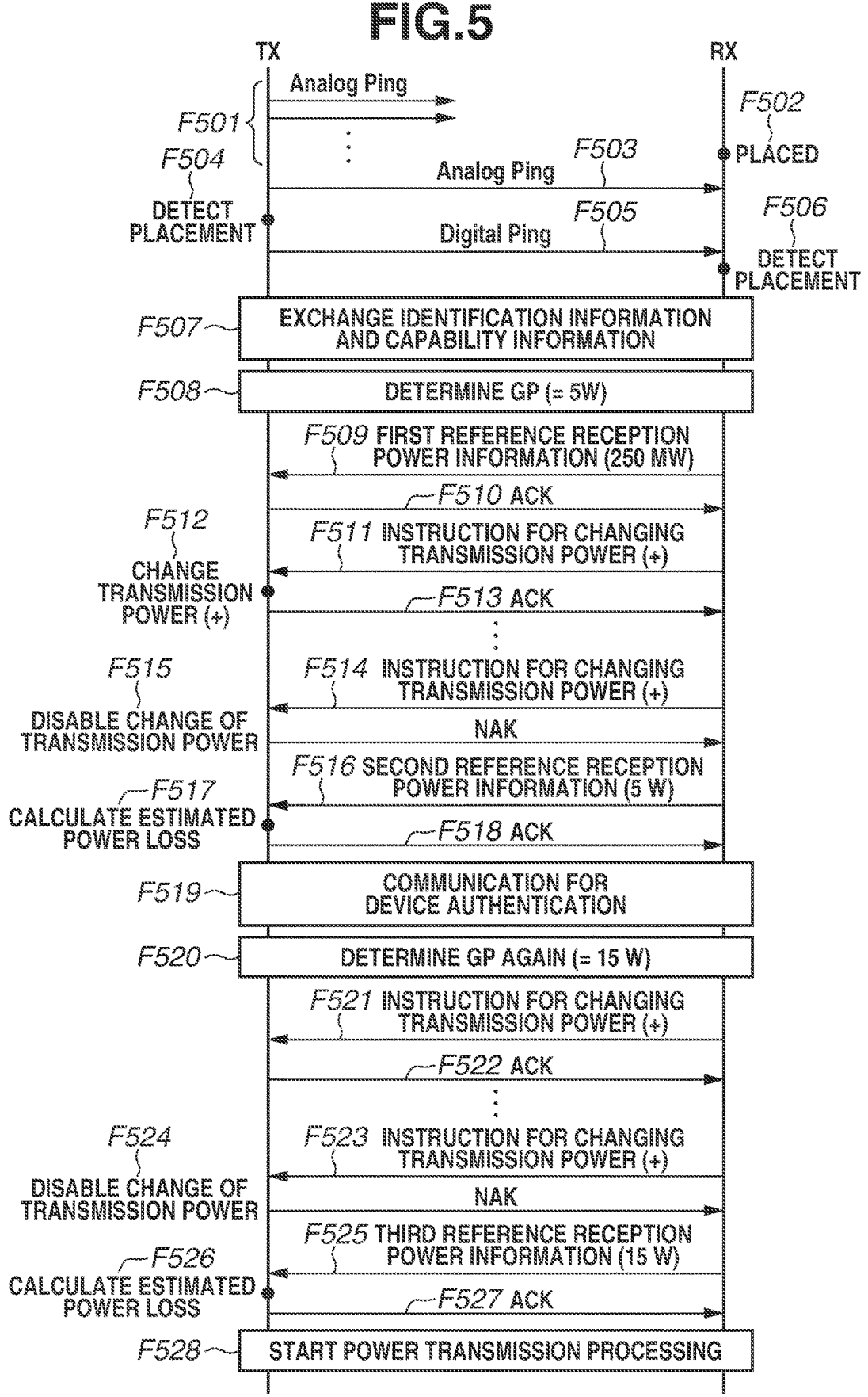
FIG. 5 is a sequence diagram illustrating an example of processing for performing the wireless power transmission according to one embodiment.

The WPC standard prescribes the selection phase, the ping phase, the I&C phase, the negotiation phase, the calibration phase, and the power transfer phase. Operations of the power transmission apparatus 402 and the power reception apparatus 401 in these phases will be described below with reference to the sequence diagram illustrated in FIG. 5. FIG. 5 is a sequence diagram illustrating the power transmission conforming to the WPC standard. An example of a sequence by the power transmission apparatus 402 (TX) and the power reception apparatus 401 (RX) will be described below.

In step F501, the TX repeatedly and intermittently transmits an analog ping of the WPC standard to detect an object existing in the power transmission limit range. The TX performs processing prescribed as the selection and the ping phases by the WPC standard, and waits until the RX is placed on the TX. In step F502, the user of the RX (e.g., a smart phone) brings the RX close to the TX to charge the RX. For example, the user places the RX on the TX to bring the RX close to the TX. In steps F503 and F504, the TX detects that an object exists in the power transmission limit range. In step F505, the TX transmits a digital ping of the WPC standard to the RX. In step F506, the RX receives the digital ping, therefore the RX can recognize that the TX has detected the RX. When the TX receives a predetermined response to the digital ping, the TX determines that the detected object is the RX that is placed on the charging stand 403. In step F507, when the TX detects that the RX is placed on the charging stand 403, the TX acquires identification information and capability information from the RX via communication in the I&C phase prescribed in the WPC standard. In this case, the identification information for the RX includes a manufacturer code and a basic device ID. The capability information for the RX includes the information element for identifying the version of the applicable WPC standard, Maximum Power Value as the value for identifying the maximum power that can be supplied to the loads by the RX, and information indicating whether the RX has the Negotiation function of the WPC standard. The TX may acquire the identification information and the capability information for the RX by using a method other than the communication in the I&C phase prescribed by the WPC standard. The identification information may be any other identification information for identifying the main body of the RX, such as a wireless power ID. The capability information may include information other than the above-described information.

In step F508, the TX determines the GP value in collaboration with the RX via the communication in the negotiation phase prescribed by the WPC standard. In step F508, communication is not limited to the communication in the negotiation phase prescribed by the WPC standard. Other procedures for determining the GP may be performed. When information indicating that the RX does not support the negotiation phase (e.g., in step F507), the TX does not perform communication in the negotiation phase. In this case, the GP value may be a small value (prescribed by the WPC standard). According to the present exemplary embodiment, GP=5 W.

After the determination of the GP, the TX performs calibration based on the GP. In the calibration processing, in step F509, the RX transmits information including the reception power in the light load state (load disconnection state, i.e., a load state where the transmission power is equal to or less than a first threshold value). Hereinafter this information is referred to as first reference reception power information. The first reference reception power information according to the present exemplary embodiment is reception power information for the RX of when the transmission power of the TX is 250 mW. While the first reference reception power information is a received Power packet (mode1) prescribed by the WPC standard, other messages may be used. The TX determines whether to receive the first reference reception power information, based on the power transmission status of the TX itself. When the TX determines to receive the information, the TX transmits an acknowledge (ACK) to the RX. On the other hand, when the TX determines not to receive the information, the TX transmits a negative acknowledge (NAK) to the RX.

In step F510, the RX receives an ACK from the TX, and performs processing for transmitting information including the reception power in the load connection state (maximum load state, i.e., a load state where the transmission power is equal to or larger than a second threshold value) to the TX. Hereinafter, this information is referred to as second reference reception power information. According to the present exemplary embodiment, since the GP is 5 W, the second reference reception power information is the reception power information for the RX when the transmission power of the TX is 5 W. In this case, the second reference reception power information is a received power packet (mode2) prescribed by the WPC standard, other messages may also be used. In step F511, the RX transmits an instruction for changing the transmission power including a positive value to increase the transmission power from the TX to 5 W.

In steps F512 and F513, the TX receives the instruction for changing the transmission power. In a case where the transmission power can be increased, the TX transmits an ACK to the RX as a response to increase the transmission power. The second reference reception power information is the reception power information when the transmission power of the TX is 5 W. In step F514, in a case where the TX receives an instruction for the power increase exceeding 5 W from the RX, then in step F515, the TX transmits a NAK in response to the instruction for changing the transmission power to disable the power transmission exceeding predetermined power.

Upon reception of NAK, then in step F516, the RX determines that the predetermined transmission power is reached, and transmits information including the reception power in the load connection state to the TX as the second reference reception power information. The TX is capable of calculating the amounts of power loss between the TX and the RX in the light load and the load connection statuses, based on the transmission power value of the TX and the reception power value included in the first and the second reference reception power information. In step F517, the TX interpolates between the amounts of power loss value to calculate the power loss value between the TX and the RX in all transmission power (from 250 mW to 5 W in this case) that can be set by the TX. In step F518, the TX transmits an ACK in response to the second reference reception power information from the RX to complete the calibration processing. In a case where the TX determines that the charge processing can be started and then starts the power transmission to the RX, the RX starts being charged. In step F519, the TX and the RX performs device authentication processing before starting the power transmission processing. In step F520, when the TX and the RX determine that both apparatuses support the GP having a larger value, the TX and the RX may set the GP value to a larger value, e.g., 15 W.

In this case, in steps F521 to F524, the RX and the TX exchange information such as the instruction for changing the transmission power, an ACK, and a NAK to increase the transmission power of the TX up to 15 W. Then, the TX and the RX perform the calibration processing again for GP=15 W. More specifically, in step F525, the RX transmits information including the reception power in the load connection state of the RX when the transmission power of the TX is 15 W. Hereinafter, this information is referred to as third reference reception power information. In step F526, the TX performs calibration based on the reception power included in the first, the second, and the third reference reception power information to calculate the amount of power loss between the TX and the RX in all transmission power (from 250 mW to 15 W in this case) that can be set by the TX. In step F527, the TX transmits an ACK in response to the third reference reception power information from the RX to complete the calibration processing. In step F528, when the TX determines that the charge processing can be started, the TX starts the power transmission to the RX and then enters the power transfer phase.

In the power transfer phase, the TX transmits power to the RX. The foreign object detection is performed based on the Power Loss method. In the Power Loss method, firstly, the TX calculates the amount of power loss between the TX and the RX in a state where no foreign object exists, based on the difference between the transmission power of the TX and the reception power of the RX through the above-described calibration. The calculated value is equivalent to the amount of reference power loss in the normal state (state where no foreign object exists) during the power transmission processing. In a case where the amount of power loss between the TX and the RX measured during the power transmission after the calibration is different from the amount of power loss in the normal state by at least a threshold value, the TX determines that "a foreign object exists" or "a foreign object is likely to exist".

This completes the description of the Power Loss method. The Power Loss method performs the foreign object detection based on the result of power loss measurement during the power transmission from the power transmission apparatus 402 to the power reception apparatus 401. The foreign object detection based on the Power Loss method has an advantage that the foreign object detection can be performed while continuing the power transmission, which makes it possible to maintain a high power transmission efficiency. However, this method has a disadvantage that the accuracy of the foreign object detection decreases while the power transmission apparatus 402 is transmitting large power.

In this way, the foreign object detection based on the Power Loss method can be performed in the power transfer phase. However, if only the foreign object detection based on the Power Loss method is performed, there are possibilities of a false detection of a foreign object and a false determination that no foreign object exists although a foreign object exists. Particularly in the power transfer phase, heat from a foreign object existing in the vicinity of the TX and the RX increases while the TX is transmitting power. In this phase, therefore, it is demanded to improve the accuracy of the foreign object detection. The present exemplary embodiment, therefore, considers the implementation of a foreign object detection method, different from the Power Loss method, to improve the accuracy of the foreign object detection.

[Foreign Object Detection Method Based on Waveform Attenuation Method]

Figure 6:
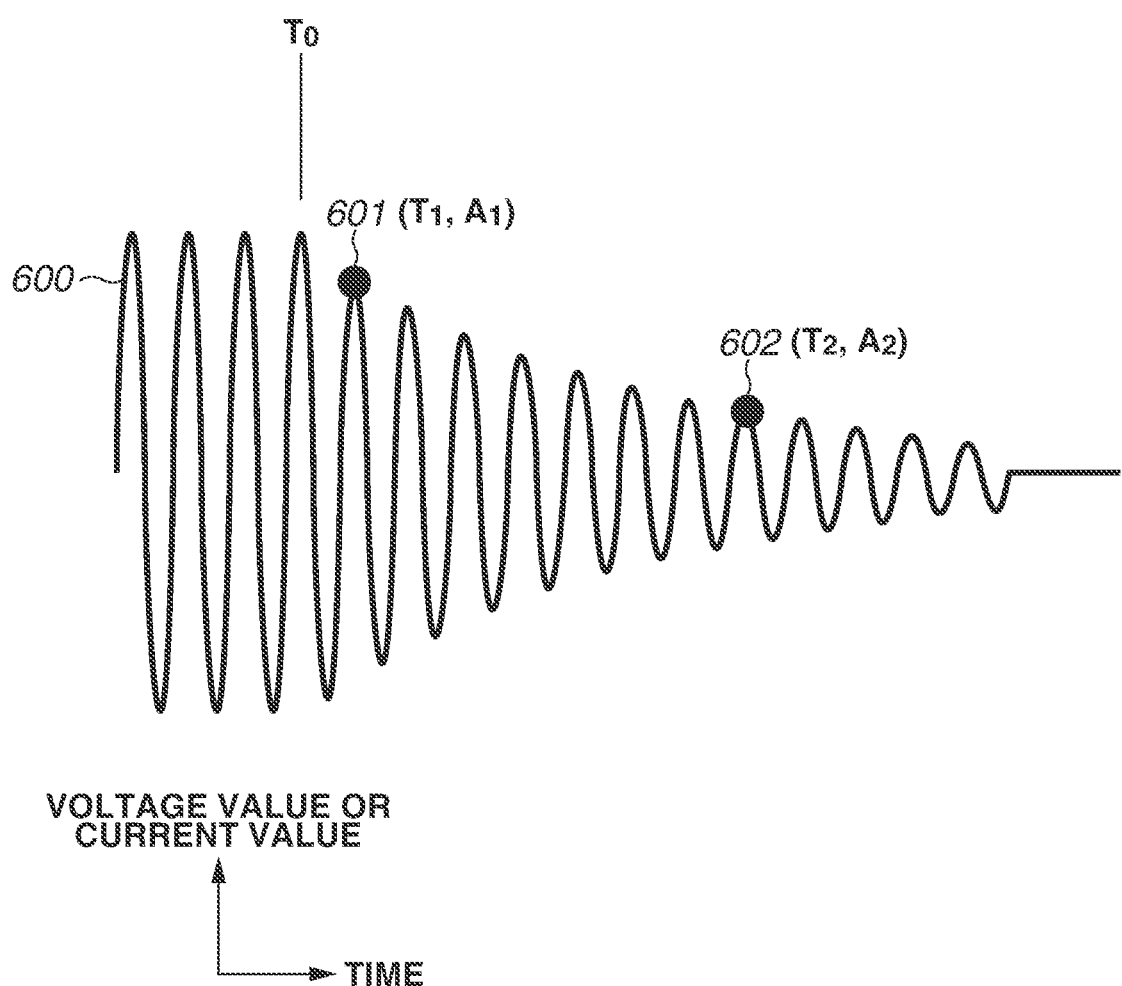
FIG. 6 is a diagram illustrating foreign object detection based on a waveform attenuation method according to one embodiment.

In the power transfer phase, the power transmission apparatus 402 transmits power to the power reception apparatus 401. Therefore, if the foreign object detection can be performed by using the transmission power waveform (voltage or current waveform) related to this power transmission, the foreign object detection can be performed without using a newly prescribed signal for the foreign object detection. A method for detecting a foreign object based on the attenuation state of the transmission power waveform (hereinafter this method is referred to as a waveform attenuation method) will be described below with reference to FIG. 6. FIG. 6 illustrates the principle of the foreign object detection based on the waveform attenuation method. As an example, the foreign object detection using the transmission power waveform related to the power transmission from the power transmission apparatus 402 (TX) to the power reception apparatus 401 (RX) will be described below.

Referring to FIG. 6, the waveform indicates a time-varying voltage value 600 (hereinafter simply referred to as a voltage value) of the high-frequency voltage applied to the power transmission antenna 105 of the TX. The horizontal axis represents time, and the vertical axis represents the voltage value. At time $T_0$, the TX transmitting power to the RX via the power transmission antenna 105 suspends the power transmission. More specifically, at time $T_0$, the power supply for power transmission from the power source unit 102 is suspended. The frequency of the transmission power waveform related to the power transmission from the TX is a predetermined frequency, for example, a fixed frequency between 85 and 205 kHz used in the WPC standard. A point 601 on the envelope of the high-frequency voltage indicates the voltage value at time $T_1$. ($T_1$, $A_1$) illustrated in FIG. 6 indicates a voltage value $A_1$ at time $T_1$. Likewise, a point 602 on the envelope of the high-frequency voltage indicates the voltage value at time $T_2$. ($T_2$, $A_2$) illustrated in FIG. 6 indicates a voltage value $A_2$ at time $T_2$. The quality factor (Q value) of the power transmission antenna 105 can be obtained based on the time variation of the voltage value after time $T_0$. For example, the Q value is calculated by Formula 1 based on time and the voltage value at the points 601 and 602 on the envelope of the voltage value, and a frequency f of the high-frequency voltage.

$$Q=\pi f(T_2-T_1)/\ln(A_1/A_2) \quad \text{(Formula 1)}$$

When a foreign object exists in the vicinity of the TX and the RX, this Q value decreases. This is because, if a foreign object exists, an energy loss is caused by the foreign object. Therefore, in a case of focusing on the inclination of the voltage value attenuation, the straight line connecting the points 601 and 602 in a case where a foreign object exists has a steeper inclination resulting in a higher attenuation factor of the waveform amplitude than in a case where no foreign object exists. This is because, when a foreign object exists, an energy loss by the foreign object occurs. More specifically, the waveform attenuation method determines presence or absence of a foreign object based on the attenuation state of the voltage value between the points 601 and 602. This method enables actually determining presence or absence of a foreign object through the comparison of certain numerical values representing the attenuation state. For example, the determination can be performed by using the Q value. This means that the smaller Q value provides the higher waveform attenuation (the higher degree of decrease in the waveform amplitude per unit time). Alternatively, the determination may be performed by using the inclination of the straight line connecting the points 601 and 602 obtained by $(A_1-A_2)/(T_2-T_1)$. Alternatively, if the attenuation state of the voltage value is observed at fixed time ($T_1$ and $T_2$), the determination can be performed based on the difference between the voltage values ($A_1-A_2$) or the ratio of the voltage values ($A_1/A_2$). Alternatively, if the voltage value $A_1$ immediately after the power transmission is suspended is constant, the determination can be performed based on the voltage value $A_2$ after a predetermined time has elapsed. Alternatively, the determination may be performed by using the value of the time duration ($T_2-T_1$) until the voltage value $A_1$ becomes the predetermined voltage value $A_2$.

As described above, presence or absence of a foreign object can be determined by the attenuation state of the voltage value during the power transmission suspension period, and there is a plurality of values representing the attenuation state. According to the present exemplary embodiment, these values representing the attenuation statuses are referred to as "waveform attenuation indices". For example, as described above, the Q value calculated by Formula 1 represents the attenuation state of the voltage value related to the power transmission, and is included in the "waveform attenuation indices". The waveform attenuation indices are values corresponding to a waveform attenuation factor. In the waveform attenuation method, the waveform attenuation factor itself may be measured as a "waveform attenuation index". The following description will be made centering mainly on a case where the waveform attenuation factor is used as a waveform attenuation index. The present exemplary embodiment is also similarly applicable to a case where other waveform attenuation indices are used.

If the vertical axis illustrated in FIG. 6 represents the current value flowing in the power transmission antenna 105, the attenuation state of the current value during the power transmission suspension period changes according to presence or absence of a foreign object, like the case of the voltage value. Then, in a case where a foreign object exists, the waveform attenuation factor is higher than that in a case where no foreign object exists. Therefore, a foreign object can be detected even by applying the above-described method to the time variation of the current value flowing in the power transmission antenna 105. More specifically, it is possible to determine presence or absence of a foreign object to detect a foreign object by using a Q value obtained based on current waveforms, an inclination of current value attenuation, a difference in current values, a ratio of current values, an absolute value of current values, and a time duration until a predetermined current value is reached, as waveform attenuation indices. The foreign object detection may be performed based on both a voltage value attenuation state and a current value attenuation state, for example, by determining presence or absence of a foreign object by using an evaluation value calculated based on a waveform attenuation index of voltage values and a waveform attenuation index of current values. Although, in the example above, the waveform attenuation indices are measured during a period when the TX suspends the power transmission, the waveform attenuation indices may be measured during a period when the TX temporarily reduces power supplied from the power source unit 102 from a predetermined power level to a power level lower than the predetermined power level.

Figure 7:
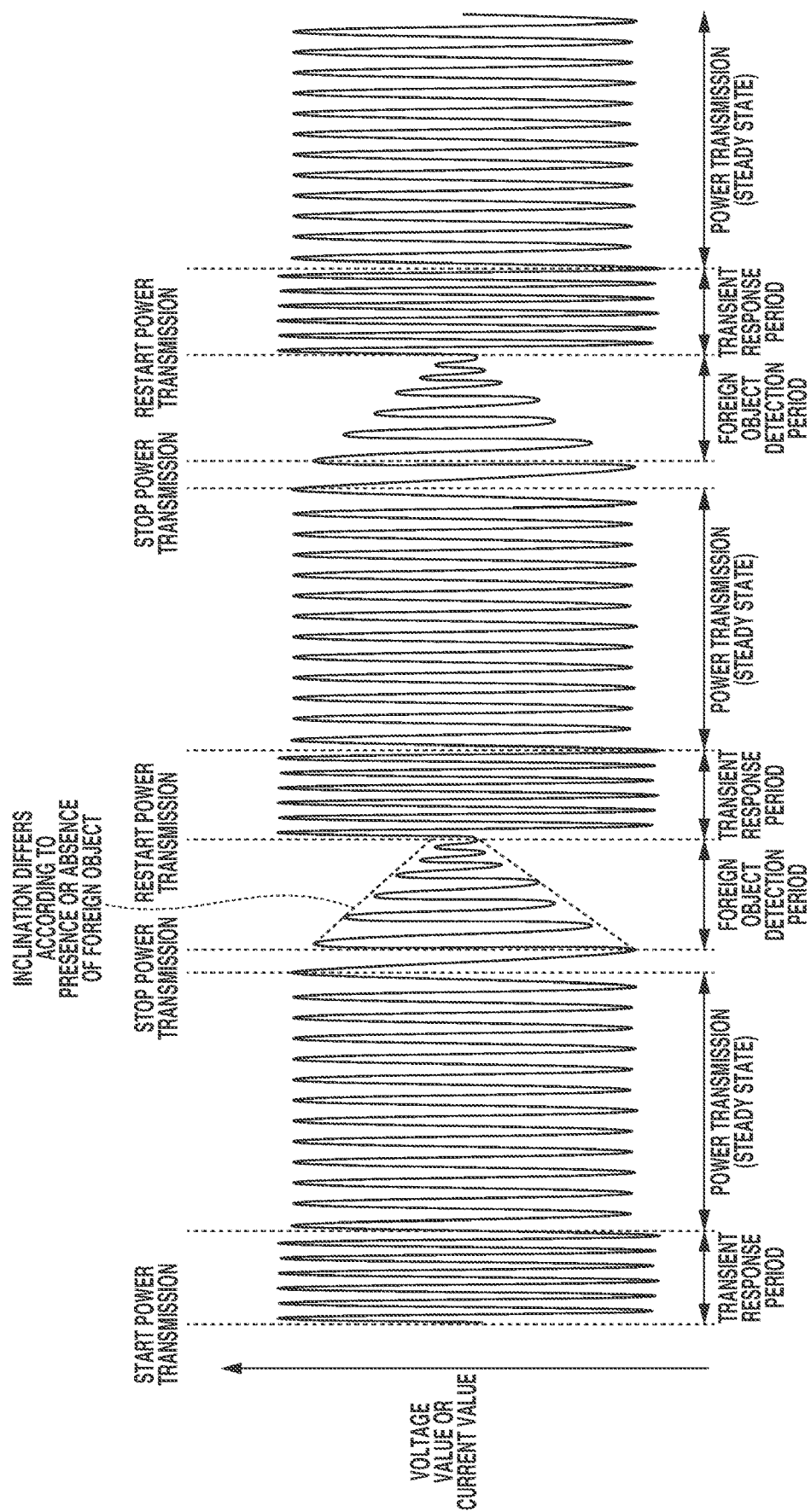
FIG. 7 is a diagram illustrating a method for performing foreign object detection based on a transmission power waveform during power transmission according to one embodiment.

A method for detecting a foreign object based on a transmission power waveform during the power transmission through the waveform attenuation method will be described below with reference to FIG. 7. FIG. 7 illustrates a transmission power waveform when the foreign object detection based on the waveform attenuation method is performed. The horizontal axis represents time, and the vertical axis represents the voltage value of a voltage applied to the power transmission antenna 105 or the resonant capacitor 107. Like FIG. 6, the vertical axis may represent the current value of a current flowing in the power transmission antenna 105. The transmission power waveform is not stable during the transient response period immediately after the TX starts the power transmission. Therefore, during the transient response period when the transmission power waveform is not stable, the RX is controlled not to perform communication (communication by load modulation) with the TX. In addition, the TX is controlled not to perform communication (communication by frequency keying) with the RX.

When the timing of the foreign object detection comes, the TX suspends the power transmission. Since an amplitude of the transmission power waveform is attenuated during the foreign object detection period during which the power transmission is suspended, the TX calculates the waveform attenuation factor of an attenuated waveform in this period. Then, the TX determines that a foreign object exists in a case where a calculated waveform attenuation factor is larger than a predetermined threshold value. In a case where no object is detected after a predetermined foreign object detection period has elapsed, the TX restarts the power transmission. After restarting the power transmission, the TX repeats the above-described cycle: waiting for the above-described transient response period, determining the timing of the foreign object detection, suspending the power transmission, and performing the foreign object detection processing. This completes the description of the basic processing of the foreign object detection based on the waveform attenuation method.

If the power reception antenna 205 and the resonant capacitor 211 of the power reception apparatus 401 are connected with the power reception unit 203, the charging unit 206, the battery 207, and other elements, the waveform attenuation factor of an attenuated waveform is affected by loads of these elements when measuring the waveform attenuation factor of the transmission power waveform. This means that the waveform attenuation factor changes by the statuses of the power reception unit 203, the charging unit 206, and the battery 207. Therefore, in case of a large waveform attenuation factor, it becomes difficult to determine whether the large waveform attenuation factor is caused by a foreign object or by the state transitions of the power reception unit 203, the charging unit 206, and the battery 207. Therefore, when measuring the waveform attenuation factor to perform the foreign object detection, the first switch unit 209 may be disconnected. This enables eliminating the influence of the battery 207. Alternatively, the second switch unit 210 may be turned ON to make a short-circuit so that a current flows in the closed-loop formed of the power reception antenna 205, the resonant capacitor 211, and the second switch unit 210. This enables eliminating the influence of the power reception unit 203, the charging unit 206, and the battery 207. Thus, the high-accuracy foreign object detection is enabled by performing the foreign object detection in a state where the first switch unit 209 is disconnected or a state where the second switch unit 210 is turned ON to make a short-circuit (connection). The high-accuracy foreign object detection is also enabled by disconnecting the first switch unit 209 and short-circuiting (connecting) the second switch unit 210.

If the power transmission antenna 105 and the resonant capacitor 107 of the power transmission apparatus 402 are connected with the power transmission unit 103, the communication unit 104, the power source unit 102, and other elements, the waveform attenuation factor of the attenuated waveform is affected by loads of these elements when measuring the waveform attenuation factor of the transmission power waveform. This means that the waveform attenuation factor changes by the statuses of the power transmission unit 103, the communication unit 104, and the power source unit 102. Therefore, in case of a large waveform attenuation factor, it becomes difficult to determine whether the large waveform attenuation factor is caused by a foreign object or by the state transitions of the power transmission unit 103, the communication unit 104, and the power source unit 102. Therefore, when measuring the waveform attenuation factor, the switch 108 may be turned ON to make a short-circuit so that a current flows in the closed-loop formed of the power transmission antenna 105, the resonant capacitor 107, and the switch 108. This enables eliminating the influence of the power transmission unit 103, the communication unit 104, and the power source unit 102. Alternatively, a switch may be provided between the closed-loop circuit (formed of the power transmission antenna 105, the resonant capacitor 107, and the switch 108) and the power transmission unit 103. When performing the foreign object detection, this switch enables eliminating the influence of the power transmission unit 103, the communication unit 104, and the power source unit 102 by disconnecting the closed-loop circuit and the power transmission unit 103. Thus, the high-accuracy foreign object detection is enabled by turning ON the switch 108 to make a short-circuit (connection) or by performing the foreign object detection in a state where the closed-loop circuit and the power transmission unit 103 are disconnected by a switch. The high-accuracy foreign object detection is also enabled by turning ON the switch 108 to make a short-circuit (connection) and by disconnecting the closed-loop circuit and the power transmission unit 103 by using a switch.

[Method for Setting Threshold Value for Foreign Object Detection Based on Waveform Attenuation Method]

Figure 11:
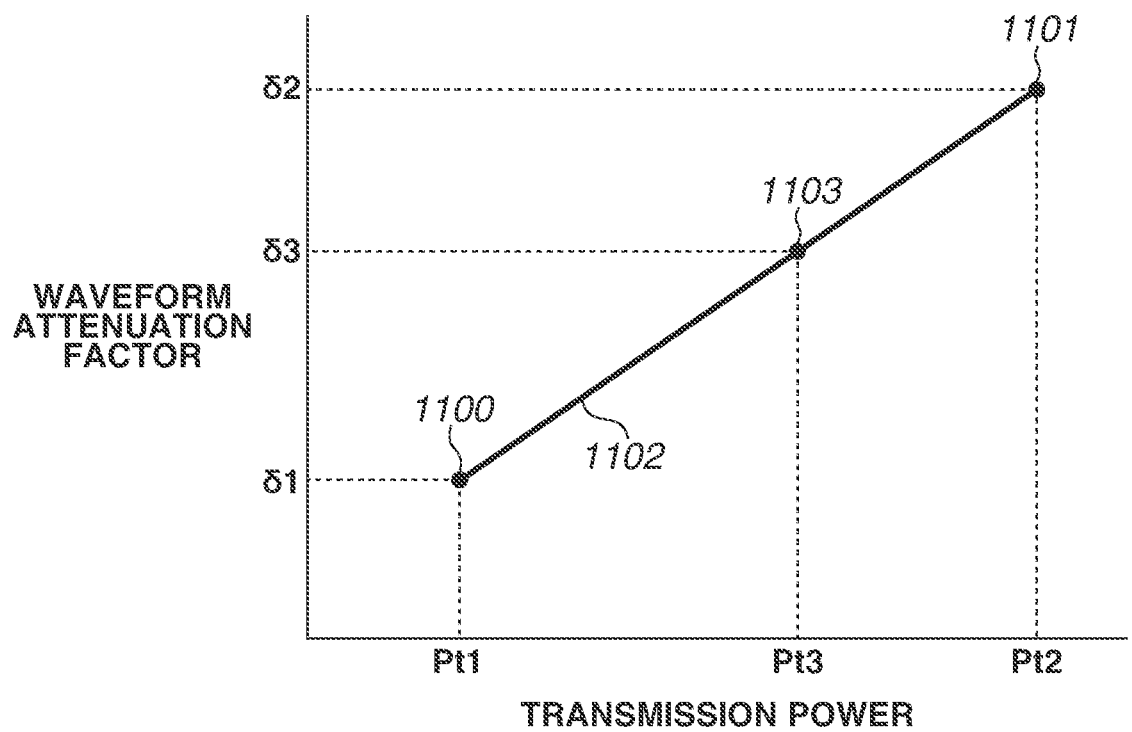
FIG. 11 is a diagram illustrating a method for setting a threshold value in the foreign object detection based on the waveform attenuation method according to one embodiment.

FIG. 11 is a diagram for explaining a method for setting a threshold value for the foreign object detection based on the waveform attenuation method. Firstly, when power is transmitted from the TX, the RX controls the loads of the RX to enter the light load state so that no power or very small power is supplied to the loads of the RX. At this timing, the TX transmits transmission power Pt1. Then, in this state, the TX suspends the power transmission and measures the waveform attenuation factor. The measured waveform attenuation factor is obtained as a waveform attenuation factor $\delta 1$. At this timing, the TX recognizes the transmission power Pt1 transmitted by the TX, and stores a calibration point 1100 that associates the transmission power Pt1 with the waveform attenuation factor $\delta 1$, in the memory 208. Then, when power is transmitted from the TX, the RX controls the loads of the RX to cause the loads to enter the load connection state so that the maximum power or power equal to or larger than a predetermined threshold value is supplied to the loads of the RX. The transmission power from the TX at this timing is transmission power Pt2. Then, in this state, the TX suspends the power transmission and measures the waveform attenuation factor. At this timing, the TX stores a calibration point 1101 that associates the transmission power Pt2 with a waveform attenuation factor $\delta 2$, in the memory 208. Subsequently, the TX linearly interpolates between the calibration points 1100 and 1101 to generate a straight line 1102. The straight line 1102 indicates the relation between the transmission power and the waveform attenuation factor of the transmission power waveform in a state where no foreign object exists at the periphery of the TX and the RX. The straight line 1102 enables the TX to estimate the waveform attenuation factor of the transmission power waveform for each transmission power value in a state where no foreign object exists. For example, with the transmission power value Pt3, the TX can estimate a waveform attenuation factor $\delta 3$ based on a point 1103 on the straight line 1102 corresponding to the transmission power value Pt3. Then, based on the result of the estimation, the TX can calculate the threshold value to be used to determine presence or absence of a foreign object for each transmission power value. For example, a waveform attenuation factor larger than the result of estimating the waveform attenuation factor when no foreign object exists with a certain transmission power value by a predetermined value (the value corresponding to the measurement error) may be set as a threshold value for determining presence or absence of a foreign object. Hereinafter, calibration processing performed by the power transmission apparatus 402 and the power reception apparatus 401 to enable the power transmission apparatus 402 to acquire a combination of the transmission power value and the waveform attenuation factor is referred to as "calibration processing (CAL processing) based on the waveform attenuation method".

The RX may perform control for supplying no power to the loads or setting the light load state, and control for setting the load connection state, after notifying the TX that each of such control is to be performed. Either one of these two pieces of control may be performed first.

An operation for calculating a threshold value to be used to determine presence or absence of a foreign object for each load (each transmission power value) according to the present exemplary embodiment may also be performed in the calibration phase. As described above, in the calibration phase, the TX acquires data which is to be required when performing the foreign object detection based on the Power Loss method. In this case, the TX acquires data related to the power loss when the load state of the RX is the light load state and when the load state of the RX is the load connection state. Accordingly, the measurement of the calibration points 1100 and 1101 illustrated in FIG. 11 may be performed together with the measurement of the power loss when the RX enters the light load state and when the RX enters the load connection state in the calibration phase. More specifically, upon reception of the first reference reception power information from the RX, the TX measures the calibration point 1100 in addition to predetermined processing which is performed in the calibration phase. Also, upon reception of the second reference reception power information from the RX, the TX measures the calibration point 1101 in addition to predetermined processing which is performed in the calibration phase. This eliminates the need of separately providing a period for measuring the calibration points 1100 and 1101, making it possible to measure the calibration points 1100 and 1101 in a shorter time.

[Processing of Power Transmission Apparatus When Waveform Attenuation Method is Applied to WPC Standard]

Processing of the power transmission apparatus 402 for performing the foreign object detection by applying the waveform attenuation method to the WPC standard will be described below. In a case where the foreign object detection based on the waveform attenuation method is performed, the power transmission apparatus 402 pre-measures the waveform attenuation factor in a state where no foreign object exists and then calculates a threshold value based on the waveform attenuation factor. Subsequently, the power transmission apparatus 402 performs the foreign object detection based on the waveform attenuation method. In a case where the measured waveform attenuation factor is larger than the threshold value, the power transmission apparatus 402 determines that "a foreign object exists" or "a foreign object is likely to exist". Meanwhile, in a case where the measured waveform attenuation factor is smaller than the threshold value, the power transmission apparatus 402 determines that "no foreign object exists" or "no foreign object is highly likely to exist".

The timing of pre-measuring the waveform attenuation factor in a state where no foreign object exists will be described below. In the WPC standard, as described above, the power transmission apparatus 402 performs the foreign object detection based on the Q value measurement method in the negotiation phase. In a case where the power transmission apparatus 402 determines that no foreign object exists as a result of the foreign object detection, the power transmission apparatus 402 proceeds to the calibration phase and then the power transfer phase. More specifically, the power transmission apparatus 402 having proceeded to the negotiation phase or subsequent phases means that the power transmission apparatus 402 determines that no foreign object exists as a result of the foreign object detection based on the Q value measurement method. Therefore, if the waveform attenuation factor is measured in any one of the negotiation, the calibration, and the power transfer phases, it is highly likely that the waveform attenuation factor can be measured in a state where no foreign object exists. Therefore, the timing of measuring the waveform attenuation factor in a state where no foreign object exists may be any one of the negotiation, the calibration, and the power transfer phases.

According to the present exemplary embodiment, the timing of measuring the waveform attenuation factor in a state where no foreign object exists is set to the first stage in the power transfer phase. This is because the probability that a foreign object is placed in the vicinity of the power transmission apparatus 402 and the power reception apparatus 401 increases with increasing elapsed time since the power transmission apparatus 402 determines that "no object exists" based on the Q value measurement method. Then, the power transmission apparatus 402 measures the waveform attenuation factor of a transmission power waveform at the timing when the foreign object detection is performed, specified by the power reception apparatus 401 or the power transmission apparatus 402. Subsequently, the power transmission apparatus 402 compares the measured waveform attenuation factor with a threshold value calculated based on the waveform attenuation factor in a state where no foreign object exists, to determine presence or absence of a foreign object.

In the waveform attenuation method, the power transmission apparatus 402 suspends the power transmission, measures the waveform attenuation factor of a transmission power waveform, and performs the foreign object detection. For this reason, this method has a disadvantage that suspending the power transmission leads to a decrease in the power transmission efficiency. On the other hand, the method has an advantage that the high-accuracy foreign object detection is possible even when the foreign object detection processing is performed during large power transmission. More specifically, the use of the waveform attenuation method enables detecting a foreign object even in a situation where the Power Loss method finds it difficult to correctly detect a foreign object.

According to the above-described exemplary embodiment, in a case where the foreign object detection based on the waveform attenuation method is performed, the waveform attenuation factor is measured before starting the power transmission in a state where there is no foreign object and then a threshold value is calculated based on the waveform attenuation factor. In a case where the measured waveform attenuation factor measured in the foreign object detection by the wave form attenuation method is larger than a threshold value, the power transmission apparatus 402 determines that "a foreign object exists" or "a foreign object is likely to exist". Meanwhile, in a case where the measured waveform attenuation factor is smaller than the threshold value, the power transmission apparatus 402 determines that "no foreign object exists" or "no foreign object is highly likely to exist". However, the foreign object detection may be performed by using the threshold value obtained based on the waveform attenuation factor measured at the timing when no foreign object exists after starting the power transmission. For example, the TX checks that no foreign object exists based on the Power Loss method during the power transmission. Then, the TX performs the first waveform attenuation factor measurement and then calculates the threshold value based on the measured waveform attenuation factor. Since the first waveform attenuation factor measurement is performed based on the Power Loss method immediately after checking that no foreign object exists in advance, the measured waveform attenuation factor is estimated to be the waveform attenuation factor in a state where no foreign object exists. Then, the TX restarts the power transmission and performs the second waveform attenuation factor measurement at the timing when the TX determines that the foreign object detection is required. Then, the TX compares the result of the second waveform attenuation factor measurement with the result of the first waveform attenuation factor measurement or the threshold value calculated based on the result of the first waveform attenuation factor measurement, thus determining presence or absence of a foreign object. More specifically, in a case where the foreign object detection based on the waveform attenuation method is performed, the TX may compare the waveform attenuation factor measured at that timing of the foreign object detection with the waveform attenuation factor measured in a prior state where no foreign object exists or a threshold value.

In the exemplary embodiment, the frequency of the transmission power waveform related to the power transmission from the power transmission apparatus 402 is a fixed frequency. However, the TX may determine presence or absence of a foreign object by performing processing for the foreign object detection according to the present exemplary embodiment for each of a plurality of frequencies, and then combining the results. The foreign object detection can be performed with higher accuracy by performing the foreign object detection using not only the waveform attenuation factor at a frequency but also the waveform attenuation factor at a plurality of frequencies.

According to the present exemplary embodiment, a wait time is provided before proceeding to each operation since the transmission power waveform is unstable in transient response immediately after the power transmission apparatus 402 suspends or starts the power transmission. The unstable transmission power waveform is caused by suddenly starting or suspending the power transmission. To avoid the unstable power transmission, the power transmission apparatus 402 may control the transmission power to gradually increase the transmission power when starting the power transmission. Alternatively, the power transmission apparatus 402 may control the transmission power to gradually decrease when suspending the power transmission.

[Foreign Object Detection Processing in Response to Communication Error]

As described above, the power transmission apparatus 402 and the power reception apparatus 401 perform communication for power transmission and reception control conforming to the WPC standard. This communication is wirelessly performed via the power transmission antenna 105 of the power transmission apparatus 402 and the power reception antenna 205 of the power reception apparatus 401. Therefore, in a case where a foreign object exists in the vicinity of the power transmission apparatus 402 and the power reception apparatus 401 (e.g., between the power transmission apparatus 402 and the power reception apparatus 401), the foreign object interferes with wireless communication between the power transmission apparatus 402 and the power reception apparatus 401, possibly resulting in a communication error. Therefore, according to the present exemplary embodiment, in a case where a communication error occurs, a foreign object is likely to exist in the vicinity of the power transmission apparatus 402 and the power reception apparatus 401. In this case, the power transmission apparatus 402 and the power reception apparatus 401 control the execution of the foreign object detection.

As described above, the Power Loss method and the waveform attenuation method are used as a foreign object detection method which is performed during the power transmission from the power transmission apparatus 402 to the power reception apparatus 401. As described above with reference to FIG. 10, in the Power Loss method, the power reception apparatus 401 notifies the power transmission apparatus 402 of the reception power value Pr3' measured by the power reception apparatus 401. The power transmission apparatus 402 calculates Pr3−Pr3' (=Ploss_FO) by subtracting the reception power value Pr3' actually received from the power reception apparatus 401 from the reception power value Pr3 in a state where no foreign object exists. In a case where a foreign object exists in the vicinity of the power transmission apparatus 402 and the power reception apparatus 401, Ploss_FO can be assumed as the power loss due to the power consumed by the foreign object. Therefore, the power transmission apparatus 402 can determine that a foreign object exists when the power Ploss_FO that may have been consumed by the foreign object is larger than a predetermined threshold value. More specifically, when foreign object detection based on the Power Loss method is performed, the power reception apparatus 401 communicates with the power transmission apparatus 402 to notify the power transmission apparatus 402 of the reception power value Pr3', as described above. Since a communication error has already occurred between the power transmission apparatus 402 and the power reception apparatus 401, an error may also occur by a similar cause in this communication for the foreign object detection.

Meanwhile, in the waveform attenuation method, the power transmission apparatus 402 suspends the power transmission and compares the waveform attenuation factor at that timing with the pre-measured waveform attenuation factor in a state where no foreign object exists to determines presence or absence of a foreign object. Therefore, the foreign object detection can be performed without communication between the power transmission apparatus 402 and the power reception apparatus 401. Accordingly, in a case where a communication error occurs, the power transmission apparatus 402 performs the foreign object detection based on the waveform attenuation method that does not require communication. This enables increasing the possibility that the foreign object detection will be successful.

Even in a case where a foreign object exists in the vicinity of the power transmission apparatus 402 and the power reception apparatus 401 during the power transmission, a communication error may not occur. However, even in a case where a communication error does not occur, the presence of a foreign object may cause a failure, such as a larger power loss and heat generation from the foreign object. Therefore, the power transmission apparatus 402 periodically performs the foreign object detection processing in the power transfer phase during which the wireless power transmission is performed, thus checking whether a foreign object exists in the vicinity of the power transmission apparatus 402 and the power reception apparatus 401. The use of the waveform attenuation method for the periodical foreign object detection temporarily suspends the power transmission from the power transmission apparatus 402 each time the foreign object detection is performed, resulting in a decrease in the power transmission efficiency. Meanwhile, the use of the Power Loss method enables detecting a foreign object while continuing the power transmission from the power transmission apparatus 402 to the power reception apparatus 401. Therefore, in a case where a communication error does not occur, the power transmission apparatus 402 and the power reception apparatus 401 periodically perform the foreign object detection based on the Power Loss method in the power transfer phase. This enables early detection of a foreign object while maintaining the high power transmission efficiency.

Figure 8:
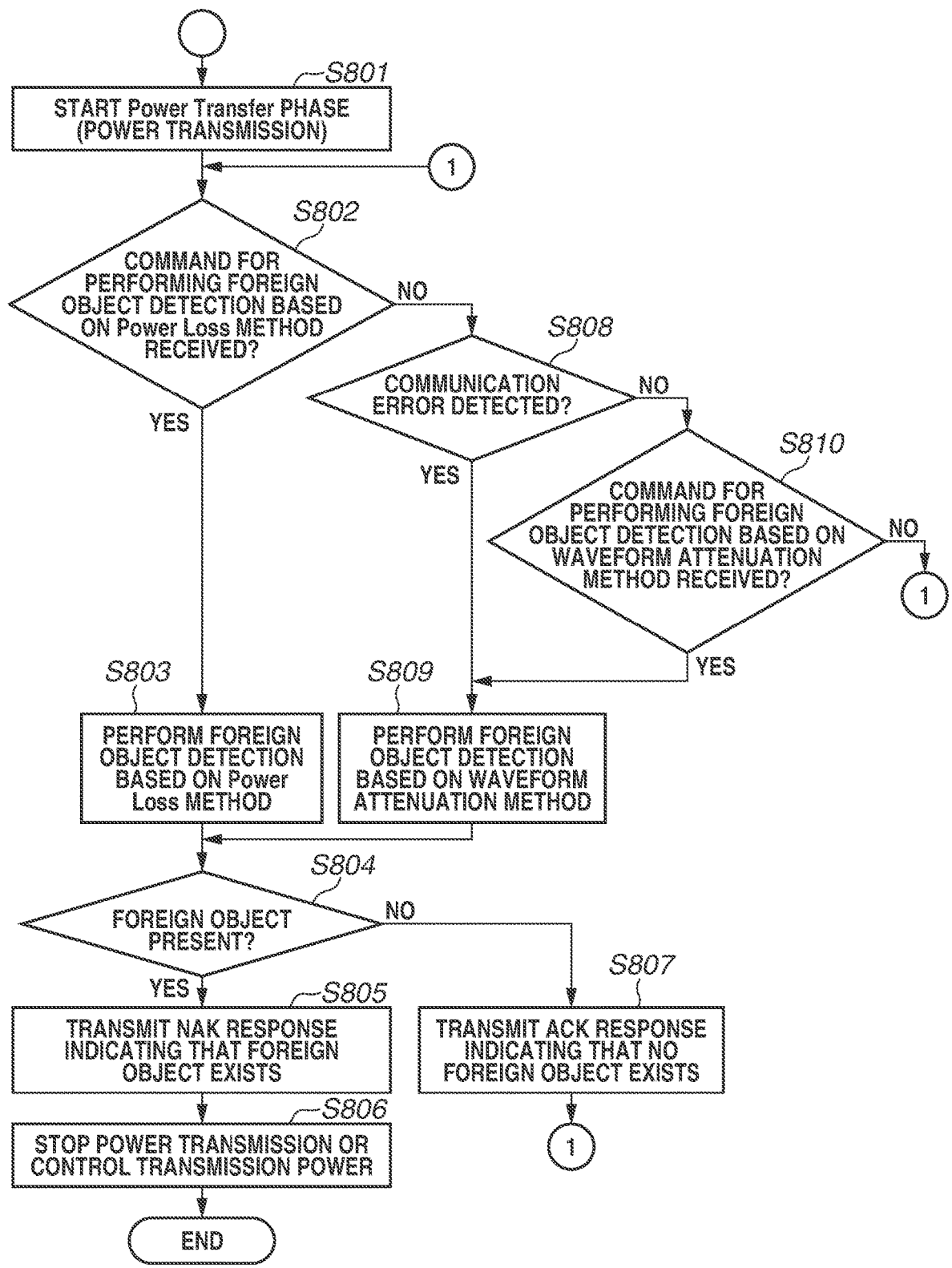
FIG. 8 is a flowchart illustrating an example of processing in a power transfer phase of the power transmission apparatus according to one embodiment.

Operations of the power transmission apparatus 402 and the power reception apparatus 401 using the above-described plurality of foreign object detection methods will be described below. FIG. 8 illustrates an example of an operation of the power transmission apparatus 402 in the power transfer phase. The processing illustrated in FIG. 8 is started when the power transmission apparatus 402 detects the power reception apparatus 401 placed on the charging stand 403, the power transmission apparatus 402 performs communication, and the processing in each phase prescribed in the WPC standard is completed. Phases performed before starting the processing illustrated in FIG. 8 includes the selection, the ping, the I&C, the negotiation, and the calibration phases. However, the processing illustrated in FIG. 8 may be started without performing at least a part of the above-described phases.

In step S801, the power transmission apparatus 402 starts the power transmission in the power transfer phase. In step S802, the power transmission apparatus 402 determines whether a command for performing the foreign object detection based on the Power Loss method is received from the power reception apparatus 401. This command includes the reception power value measured by the power reception apparatus 401. In a case where the power transmission apparatus 402 receives this command (YES step S802), the processing proceeds to step S803. In step S803, the power transmission apparatus 402 performs the foreign object detection based on the Power Loss method, based on the reception power value received from the power reception apparatus 401 and the transmission power value measured by the power transmission apparatus 402.

In step S804, the power transmission apparatus 402 determines whether a foreign object exists in the vicinity of the power transmission apparatus 402 based on the result of the foreign object detection processing. In a case where the power transmission apparatus 402 determines that a foreign object exists (YES in step S804), the processing proceeds to step S805. In step S805, the power transmission apparatus 402 transmits a negative acknowledge (NAK) as information indicating the presence of a foreign object to the power reception apparatus 401. In step S806, the power transmission apparatus 402 performs control to suspend the power transmission or reduce the transmission power. Meanwhile, in a case where the power transmission apparatus 402 determines that no foreign object exists (NO in step S804), the processing proceeds to step S807. In step S807, the power transmission apparatus 402 transmits an acknowledge (ACK) as information indicating absence of a foreign object to the power reception apparatus 401 and continues the power transmission. Then, the processing returns to step S802.

Meanwhile, in a case where the command for performing the foreign object detection based on the Power Loss method is not received (NO in step S802), the processing proceeds to step S808. In step S808, the power transmission apparatus 402 determines whether a communication error occurred in the communication between the power transmission apparatus 402 and the power reception apparatus 401. In a case where the power transmission apparatus 402 does not receive a command transmitted from the power reception apparatus 401, the power transmission apparatus 402 determines that a communication error occurred (or detects a communication error). For example, to periodically perform the foreign object detection based on the Power Loss method, the power reception apparatus 401 periodically transmits the command for performing the foreign object detection based on the Power Loss method to the power transmission apparatus 402. In a case where the power transmission apparatus 402 does not receive the command which is periodically received or in a case where the power transmission apparatus 402 receives a command including an invalid packet, the power transmission apparatus 402 determines that a communication error occurred. However, the method for detecting a communication error by the power transmission apparatus 402 is not limited thereto.

In a case where the power transmission apparatus 402 detects a communication error (YES in step S808), i.e., when a foreign object may possibly exist, the processing proceeds to step S809. In step S809, the power transmission apparatus 402 performs the foreign object detection based on the waveform attenuation method. Then, the power transmission apparatus 402 performs the processing from step S804 to step S807 based on the result of the foreign object detection like the case where the foreign object detection based on the Power Loss method is performed.

Meanwhile, in a case where the power transmission apparatus 402 does not detect a communication error (NO in step S808), the processing proceeds to step S810. In step S810, the power transmission apparatus 402 determines whether a command for performing the foreign object detection based on the waveform attenuation method is received from the power reception apparatus 401. The power reception apparatus 401 transmits this command, for example, when the power reception apparatus 401 detects a communication error (described below). In a case where the power transmission apparatus 402 determines that this command is received (YES in step S810), the processing proceeds to step S809. In step S809, the power transmission apparatus 402 performs the foreign object detection based on the waveform attenuation method. Then, the power transmission apparatus 402 performs the processing from step S804 to step S807 based on result of the foreign object detection.

Figure 9:
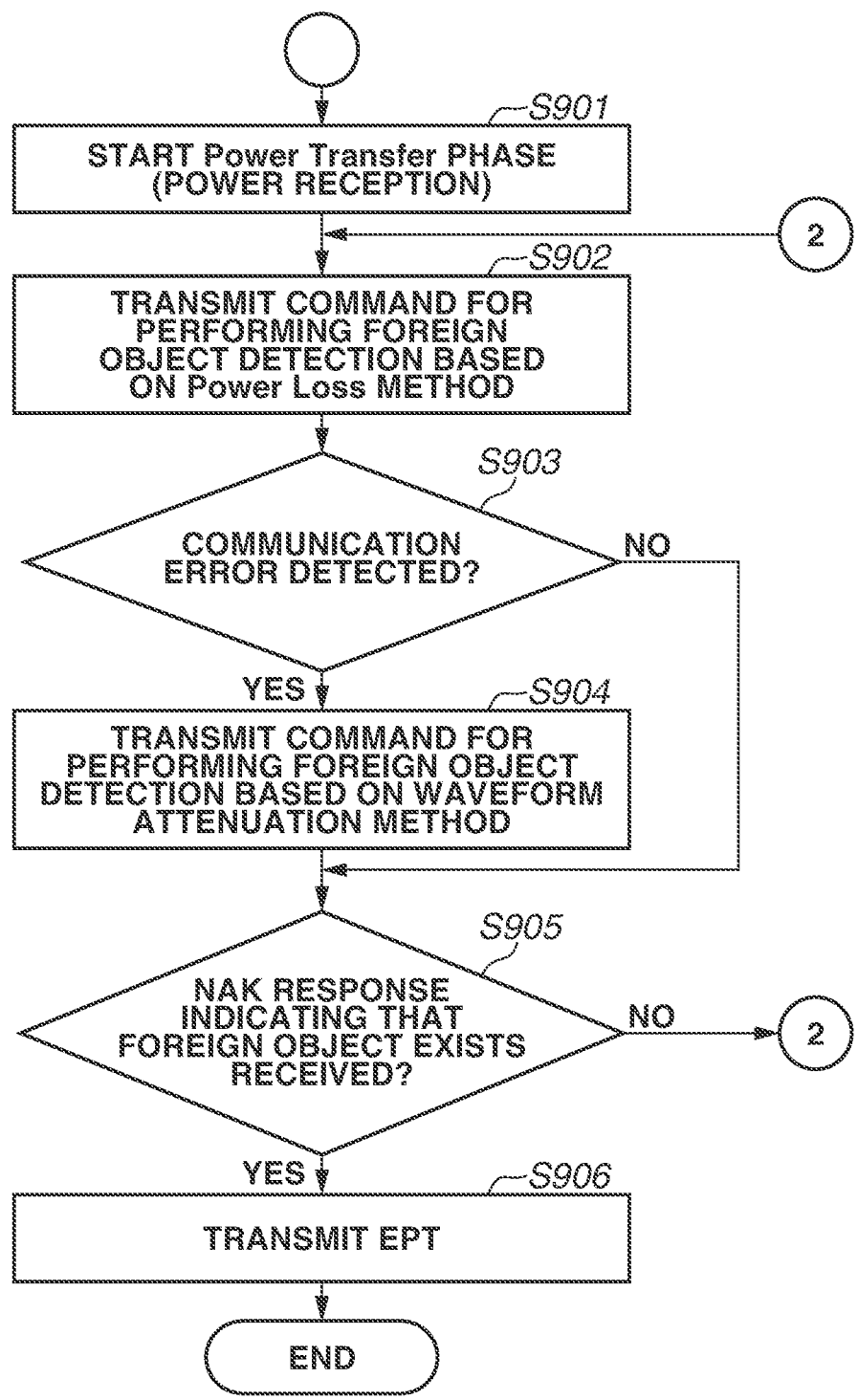
FIG. 9 is a flowchart illustrating an example of processing in the power transfer phase of the power reception apparatus according to one embodiment.

FIG. 9 illustrates an example of an operation in the power transfer phase of the power reception apparatus 401. The processing illustrated in FIG. 9 is started at a similar timing to the processing illustrated in FIG. 8. In step S901, the power reception apparatus 401 starts the power reception in the power transfer phase. In step S902, the power reception apparatus 401 transmits the command for performing the foreign object detection based on the Power Loss method, as a command to be periodically transmitted to the power transmission apparatus 402. This command is issued by the power reception apparatus 401 and requests the power transmission apparatus 402 to perform the foreign object detection processing based on the Power Loss method.

In step S903, the power reception apparatus 401 determines whether a communication error occurred in the communication between the power transmission apparatus 402 and the power reception apparatus 401. The power reception apparatus 401 determines a communication error as follows. The power reception apparatus 401 transmits various commands to the power transmission apparatus 402 according to the WPC standard. Upon reception of a command from the power reception apparatus 401, the power transmission apparatus 402 transmits a response (acknowledge or negative acknowledge) to the power reception apparatus 401. For example, when periodically performing the foreign object detection based on the Power Loss method, the power reception apparatus 401 periodically transmits the command for performing the foreign object detection based on the Power Loss method to the power transmission apparatus 402. Upon reception of the command, the power transmission apparatus 402 transmits a response to the power reception apparatus 401. Accordingly, in a case where the power reception apparatus 401 does not receive a response from the power transmission apparatus 402 after transmitting the command for performing the foreign object detection based on the Power Loss method to the power transmission apparatus 402, the power reception apparatus 401 determines that a communication error occurred (i.e., the power transmission apparatus 402 detects a communication error). In a case where the power reception apparatus 401 receives a response including an invalid packet from the power transmission apparatus 402, the power reception apparatus 401 determines that a communication error occurred. However, the method for detecting a communication error by the power reception apparatus 401 is not limited thereto.

In a case where the power reception apparatus 401 detects a communication error (YES in step S903), there is a possibility that a foreign object is likely to exist and that the foreign object detection based on the Power Loss method may not normally be performed. Then, the processing proceeds to step S904. In step S904, the power reception apparatus 401 transmits the command for performing the foreign object detection based on the waveform attenuation method to the power transmission apparatus 402. This command is issued by the power reception apparatus 401 and requests the power transmission apparatus 402 to perform the foreign object detection processing based on the waveform attenuation method. Then, the power reception apparatus 401 waits for a response according to the result of performing the foreign object detection based on the waveform attenuation method from the power transmission apparatus 402. In a case where the power reception apparatus 401 does not detect a communication error (NO in step S903), the power reception apparatus 401 waits for a response according to the result of performing the foreign object detection based on the Power Loss method from the power transmission apparatus 402. Then, the processing proceeds to step S905.

In step S905, the power reception apparatus 401 determines whether a negative acknowledge as information indicating the presence of a foreign object is received from the power transmission apparatus 402. In a case where the power reception apparatus 401 receives a negative acknowledge (YES in step S905), the processing proceeds to step S906. In step S906, the power reception apparatus 401 transmits an End Power Transfer (EPT) command as a command for ending the power transmission, to the power transmission apparatus 402. Then, the power reception apparatus 401 enters a non-power reception state. Meanwhile, in a case where the power reception apparatus 401 does not receive a negative acknowledge, for example, when the power reception apparatus 401 receives an acknowledge (NO in step S905), the power reception apparatus 401 continues the power reception. Then, the processing returns to step S902.

This completes the description of examples of operations of the power transmission apparatus 402 and the power reception apparatus 401. As described above, in a case where a communication error is detected in the communication between the power transmission apparatus 402 and the power reception apparatus 401, the power transmission apparatus 402 and the power reception apparatus 401 perform the foreign object detection based on the waveform attenuation method. This makes it possible to detect a foreign object in the vicinity of the power transmission apparatus 402 and the power reception apparatus 401 in an early stage and suspend the power transmission (or reduce the transmission power), thus improving the probability of preventing an extreme temperature rise of the foreign object. Although, in the above descriptions, both the power transmission apparatus 402 and the power reception apparatus 401 perform the error detection, either one of the power transmission apparatus 402 and the power reception apparatus 401 may perform the error detection.

As described above, the power transmission apparatus 402 may short-circuit the switch 108 at the timing when the foreign object detection based on the waveform attenuation method is performed, and disconnect the switch between the closed-loop circuit including the power transmission antenna 105 and the power transmission unit 103. This eliminates the influences of the power transmission unit 103, the communication unit 104, and the power source unit 102 on the attenuated waveform, enabling the foreign object detection with higher accuracy. Likewise, the power reception apparatus 401 may short-circuit the second switch unit 210 and disconnect the first switch unit 209 at the timing when the foreign object detection based on the waveform attenuation method is performed. This eliminates the influences of the power reception unit 203, the charging unit 206, and the battery 207 on the attenuated waveform, enabling the foreign object detection with higher accuracy. In this case, the power transmission apparatus 402 and the power reception apparatus 401 perform communication to identify the timing of when the foreign object detection is performed.

According to the above-described exemplary embodiment, when the foreign object detection based on the waveform attenuation method is performed, the power transmission apparatus 402 measures the attenuation factor of a voltage applied to the power transmission antenna 105 or a current flowing in the power transmission antenna 105 as the attenuation state of the transmission power waveform related to the wireless power transmission. However, since the power transmission antenna 105 and the power reception antenna 205 facing each other are electromagnetically connected, the electromagnetic energy of the power transmission antenna 105 is also excited in the power reception antenna 205. Therefore, the foreign object detection based on the waveform attenuation method can also be implemented by the power reception apparatus 401 measuring the attenuation factor of a voltage applied to the power reception antenna 205 or a current flowing in the power reception antenna 205 as the attenuation state of the power reception waveform related to the wireless transmission.

When the power transmission apparatus 402 measures the waveform attenuation factor, the power transmission apparatus 402 may notify the power reception apparatus 401 of the result of the waveform attenuation factor measurement or a threshold value obtained based on the measurement result. This enables the power reception apparatus 401 to determine presence or absence of a foreign object based on the measurement result received from the power transmission apparatus 402. Likewise, when the power reception apparatus 401 measures the waveform attenuation factor, the power reception apparatus 401 may notify the power transmission apparatus 402 of the result of the waveform attenuation factor measurement or a threshold value obtained based on the measurement result. This enables the power transmission apparatus 402 to determine presence or absence of a foreign object based on the measurement result received from the power reception apparatus 401.

In the above descriptions with reference to FIGS. 8 and 9, the waveform attenuation method is employed to perform the high-accuracy foreign object detection in a case where a communication error is detected. Thus, even if the power transmission apparatus 402 and the power reception apparatus 401 fails to detect a foreign object in the periodical foreign object detection processing based on the Power Loss method, performing the foreign object detection processing based on the waveform attenuation method in response to a communication error enables detecting a foreign object and suspending the power transmission (or reducing the transmission power). However, to avoid the decrease in the power transmission efficiency, the power transmission apparatus 402 and the power reception apparatus 401 may perform the foreign object detection based on the Power Loss method in response to the communication error detection. In this case, the power transmission apparatus 402 detected a communication error in step S808 illustrated in FIG. 8 may perform the foreign object detection based on the Power Loss method instead of performing the foreign object detection based on the waveform attenuation method in step S809. The power reception apparatus 401 detected a communication error in step S903 illustrated in FIG. 9 may transmit the command for performing the foreign object detection based on the Power Loss method instead of transmitting the command for performing the foreign object detection based on the waveform attenuation method in step S904. When the foreign object detection based on the Power Loss method is performed in step S809, the power transmission apparatus 402 requests the power reception apparatus 401 to transmit a command including the reception power value, and detects a foreign object based on the reception power value received in response to the request and the transmission power value measured by the power transmission apparatus 402. In a case where the power reception apparatus 401 transmits the command for performing the foreign object detection based on the Power Loss method in step S903, the power transmission apparatus 402 that received the command performs the foreign object detection based on the Power Loss method. Even if the power transmission apparatus 402 and the power reception apparatus 401 fail to detect a foreign object in the periodical foreign object detection processing based on the Power Loss method, performing the foreign object detection processing again in response to a communication error increases the probability of detecting a foreign object.

When performing the foreign object detection based on the Power Loss method in response to the communication error detection, the communication for foreign object detection is performed between the power transmission apparatus 402 and the power reception apparatus 401. However, a communication error may occur again in this communication, and a possible result is that the power transmission apparatus 402 or the power reception apparatus 401 may be unable to receive data from the communication partner or may receive data including an invalid packet. In a case where the command for performing the foreign object detection transmitted from the power reception apparatus 401 to the power transmission apparatus 402 is lost because of a communication error, the power transmission apparatus 402 is unable to recognize that the foreign object detection is requested and therefore does not perform the foreign object detection. Consequently, the power transmission apparatus 402 does not transmit a response to the command for performing the foreign object detection to the power reception apparatus 401.

Therefore, in a case where it is determined that such a communication error occurred again, the power reception apparatus 401 may transmit the EPT command as a command for ending the power transmission to the power transmission apparatus 402 and enter the non-power reception state. Upon reception of the EPT command, the power transmission apparatus 402 suspends the power transmission. Even if the power transmission apparatus 402 is unable to receive the EPT command, the power transmission apparatus 402 may detect that the power reception apparatus 401 entered the non-power reception state, suspend the power transmission, and enter the selection phase. In a case where a communication error occurs again in the communication for performing the foreign object detection in response to the communication error detection, the frequency of the communication error occurrence is high. In this case, it can be considered that a foreign object is highly likely to exist or a certain factor other than a foreign object interferes with communication. Therefore, in this case, the occurrence of a failure due to the power transmission can be prevented by suspending the power transmission or reducing the transmission power, as described above.

In a case where the above-described foreign object detection based on the Power Loss method or foreign object detection based on the waveform attenuation method is performed, the foreign object detection may possibly fail. For example, in a case where the power reception apparatus 401 placed on the power transmission apparatus 402 moves during the foreign object detection processing, the measured value to be used for the foreign object detection becomes an abnormal value, possibly resulting in a failure of the foreign object detection. Also, in this case, the power transmission apparatus 402 and the power reception apparatus 401 may suspend the power transmission or reduce the transmission power since these apparatuses may be unsuitable for performing the wireless power transmission. This enables preventing the occurrence of a failure in the power transmission.

[Foreign Object Detection Processing in Response to Power Reduction]

Processing for the foreign object detection performed by the power transmission apparatus 402 and the power reception apparatus 401 in response to the communication error detection has been described above with reference to FIGS. 8 and 9. Processing for the foreign object detection performed in response to the reception power reduction in the power reception apparatus 401 will be described below.

In a case where a foreign object exists in the vicinity of the power transmission apparatus 402 and the power reception apparatus 401, the foreign object interferes with the wireless power transmission between the power transmission apparatus 402 and the power reception apparatus 401, possibly resulting in a reception power reduction in the power reception apparatus 401. Therefore, in a case where a reception power reduction in the power reception apparatus 401 occurs, a foreign object is likely to exist in the vicinity of the power transmission apparatus 402 and the power reception apparatus 401. Thus, the power transmission apparatus 402 and the power reception apparatus 401 control the execution of the foreign object detection.

Operations of the power reception apparatus 401 and the power reception apparatus 401 in case of performing the foreign object detection in a case where the power transmission apparatus 402 detects the reception power reduction in the power reception apparatus 401 will be described below. The power transmission apparatus 402 periodically receives the reception power value Pr3' from the power reception apparatus 401 to perform the foreign object detection based on the Power Loss method in the power transfer phase. Then, the power transmission apparatus 402 determines whether a reception power reduction in the power reception apparatus 401 occurs, based on the reception power value Pr3' received from the power reception apparatus 401 or Ploss_FO as the difference between pre-identified Pr3 and Pr3'. In a case where the reception power value Pr3' received from the power reception apparatus 401 is smaller than a threshold value or in a case where Ploss_FO is larger than a threshold value, the power transmission apparatus 402 determines that a reception power reduction in the power reception apparatus 401 occurs, and performs the foreign object detection based on the waveform attenuation method.

More specifically, the power transmission apparatus 402 periodically performs the foreign object detection based on the Power Loss method for maintaining the high power transmission efficiency and, according to the reception power received from the power reception apparatus 401 for the foreign object detection, performs the foreign object detection based on the waveform attenuation method with higher accuracy of the foreign object detection. For example, for the value of Pr3' or Ploss_FO, the power transmission apparatus 402 may provide a first threshold value for determining that a foreign object is likely to exist and a second threshold value for determining that a foreign object exists. Then, in a case where the value of Pr3' or Ploss_FO is larger than the second threshold value, the power transmission apparatus 402 determines that a foreign object is detected based on the Power Loss method, and then suspends the power transmission or reduces the transmission power. In a case where the value of Pr3' or Ploss_FO is larger than the first threshold value and is not larger than the second threshold value, the power transmission apparatus 402 performs the foreign object detection based on the waveform attenuation method. Thus, even in a case where a foreign object cannot be detected in the foreign object detection based on the Power Loss method, performing the higher-accuracy waveform attenuation method in response to the reception power reduction enables detecting a foreign object. Each of the above-described threshold values may be set based on data (the straight line 1002 illustrated in FIG. 10) obtained in the Calibration processing of the Power Loss method.

Although, in the above descriptions, the power transmission apparatus 402 performs the foreign object detection in response to the reception power reduction in the power reception apparatus 401, the power transmission apparatus 402 may perform the foreign object detection in response to the variation in the transmission power of the power transmission apparatus 402. The power transmission apparatus 402 can measure the transmission power value currently being transmitted by the power transmission apparatus 402. Accordingly, in a case where the difference between the transmission power value and a predetermined reference value is larger than a threshold value, the power transmission apparatus 402 determines that a foreign object may possibly exist and may perform the foreign object detection based on the waveform attenuation method. This configuration also enables obtaining a similar result to that which is obtained in case of performing the foreign object detection in response to the reception power reduction.

Operations of the power transmission apparatus 402 and the power reception apparatus 401 in case of performing the foreign object detection when the power reception apparatus 401 detects the reception power reduction in the power reception apparatus 401 will be described below. The power reception apparatus 401 periodically measures the power received from the power transmission apparatus 402 in the power transfer phase. Then, the power reception apparatus 401 determines whether a reception power reduction in the power reception apparatus 401 occurs based on the periodically measured reception power value. In a case where the calculated reception power value is smaller than a threshold value or in a case where the difference between the calculated reception power value and the reference value is larger than a threshold value, the power reception apparatus 401 determines that a reception power reduction in the power reception apparatus 401 occurs, and requests the power transmission apparatus 402 to perform the foreign object detection based on the waveform attenuation method.

More specifically, the power reception apparatus 401 periodically measures the reception power value and, according to the measurement result, requests the power transmission apparatus 402 to perform the foreign object detection based on the waveform attenuation method with high accuracy of the foreign object detection. For example, in a case where the difference between the measured reception power and the reference value is equal to or less than a predetermined threshold value, the power reception apparatus 401 may transmit the command for performing the foreign object detection based on the Power Loss method. Meanwhile, in a case where the difference between the measured reception power and the reference value is larger than the predetermined threshold value, the power reception apparatus 401 may transmit the command for performing the foreign object detection based on the waveform attenuation method. In a case where a foreign object is highly likely to exist (in a case of the reception power reduction), the above-described configuration enables performing the foreign object detection based on the waveform attenuation method with high accuracy. Meanwhile, in a case where no foreign object is likely to exist, the above-described configuration enables performing the foreign object detection based on the Power Loss method while maintaining the high power transmission efficiency.

In a case where the reduction in the reception power value is larger than a threshold value, the power reception apparatus 401 determines that a foreign object exists and may request the power transmission apparatus 402 to suspend the power transmission or reduce the transmission power. For the reduction in the reception power value, the power reception apparatus 401 may provide the first threshold value for determining that a foreign object is likely to exist and the second threshold value for determining that a foreign object exists. Then, in a case where the reception power reduction is larger than the first threshold value and is not larger than the second threshold value, the power reception apparatus 401 requests the power transmission apparatus 402 to perform the foreign object detection based on the waveform attenuation method. In a case where the reception power reduction is larger than the second threshold value, the power reception apparatus 401 may transmit the EPT command to the power transmission apparatus 402 to request the power transmission apparatus 402 to suspend the power transmission. Alternatively, the power reception apparatus 401 may transmit a command for requesting the power transmission apparatus 402 to reduce the transmission power, to the power transmission apparatus 402.

As described above, in a case where the power transmission apparatus 402 and the power reception apparatus 401 detect the reception power reduction in the power reception apparatus 401, the power transmission apparatus 402 and the power reception apparatus 401 control the execution of the foreign object detection based on the waveform attenuation method. This makes it possible to detect a foreign object in an early state in a case where a foreign object is likely to exist in the vicinity of the power transmission apparatus 402 and the power reception apparatus 401.

[Foreign Object Detection Processing According to Calibration Data]

Processing for the foreign object detection according to the data obtained in the Calibration processing based on the Power Loss method or the data obtained in the Calibration processing based on the waveform attenuation method will be described below.

As described above, in the foreign object detection based on the Power Loss method and the foreign object detection based on the waveform attenuation method, the calibration processing is performed to set a threshold value as a reference that is used to determine presence or absence of a foreign object. It is assumed that these pieces of reference data obtained in the calibration processing indicate the relation between the transmission power value and the reception power value or between the transmission power value and the waveform attenuation factor in a state where no foreign object exists. Therefore, in a case where the reference data obtained in the calibration processing does not indicate the predetermined relation between the transmission power value and the reception power value or between the transmission power value and the waveform attenuation factor, a foreign object is likely to exist in the vicinity of the power transmission apparatus 402 and the power reception apparatus 401. Therefore, the power transmission apparatus 402 and the power reception apparatus 401 control the execution of the foreign object detection.

Firstly, operations of the power transmission apparatus 402 and the power reception apparatus 401 for performing the foreign object detection according to the data obtained in the calibration processing based on the Power Loss method will be described below. The power transmission apparatus 402 and the power reception apparatus 401 perform the calibration processing based on the Power Loss method, as processing for determining the threshold value to be used for the Power Loss method. The data obtained in the calibration processing based on the Power Loss method represents the relation between the transmission power and the reception power in a state where no foreign object exists, and thus possible range of the reception power value according to the transmission power value can be estimated in advance. In a case where data is obtained in the calibration processing based on the Power Loss method, the power transmission apparatus 402 determines whether the reception power value included in the data falls within a range predetermined according to the transmission power value. In a case where the reception power value is out of the range, a foreign object is likely to exist in the vicinity of the power transmission apparatus 402 and the power reception apparatus 401, and therefore the power transmission apparatus 402 performs the foreign object detection based on the waveform attenuation method. Then, in a case where the power transmission apparatus 402 determines by the foreign object detection based on the waveform attenuation method that a foreign object exists, the power transmission apparatus 402 suspends the power transmission or reduces the transmission power. Meanwhile, in a case where the power transmission apparatus 402 determines by the foreign object detection based on the waveform attenuation method that no foreign object exists, the power transmission apparatus 402 performs the calibration processing based on the Power Loss method again to update the data.

More specifically, the power transmission apparatus 402 performs the foreign object detection based on the waveform attenuation method, different from the Power Loss method, according to the data values obtained in the calibration processing based on the Power Loss method. In a case where the power transmission apparatus 402 determines that a foreign object is likely to exist in the calibration processing based on the Power Loss method, the above-described configuration enables detecting a foreign object in an early stage by performing the foreign object detection based on the waveform attenuation method. Further, in a case where the accuracy of the foreign object detection based on the Power Loss method decreases because of incorrect calibration data, the use of the waveform attenuation method enables detecting a foreign object with high accuracy. The power reception apparatus 401 may determine whether a foreign object is detected according to the data obtained in the calibration processing.

Operations of the power transmission apparatus 402 and the power reception apparatus 401 in case of performing the foreign object detection according to the data obtained in the calibration processing based on the waveform attenuation method will be described below. The power transmission apparatus 402 and the power reception apparatus 401 perform the calibration processing based on the waveform attenuation method as processing for determining the threshold value to be used for the waveform attenuation method. The reference data obtained in the calibration processing based on the waveform attenuation method will represent the relation between the transmission power and the waveform attenuation factor in a state where no foreign object exists, and thus the possible range of the data can be estimated in advance. The power transmission apparatus 402 determines whether the waveform attenuation factor indicated by the reference data obtained in the calibration processing based on waveform attenuation method falls within a predetermined range. In a case where the waveform attenuation factor is out of the predetermined range, a foreign object is likely to exist in the vicinity of the power transmission apparatus 402 and the power reception apparatus 401, and therefore the power transmission apparatus 402 performs the foreign object detection based on the Power Loss method. More specifically, the power transmission apparatus 402 transmits a command for notifying the power reception apparatus 401 of the execution of the Power Loss method, to the power reception apparatus 401. Upon reception of the command, the power reception apparatus 401 transmits the command for performing the foreign object detection based on the Power Loss method including the reception power value measured by the power reception apparatus 401, to the power transmission apparatus 402. Upon reception of the command from the power reception apparatus 401, the power transmission apparatus 402 performs the foreign object detection based on the Power Loss method.

In a case where the power transmission apparatus 402 determines by the foreign object detection based on the Power Loss method that a foreign object exists, the power transmission apparatus 402 performs control to suspend the power transmission or reduce the transmission power. Meanwhile, in a case where the power transmission apparatus 402 determines by the foreign object detection based on the Power Loss method that no foreign object exists, the power transmission apparatus 402 performs the calibration processing based on the waveform attenuation method again to update the data. In this way, the power transmission apparatus 402 performs the foreign object detection based on the Power Loss method, different from the waveform attenuation method, according to the data value obtained in the calibration processing based on the waveform attenuation method. In a case where the power transmission apparatus 402 determines that a foreign object is likely to exist in the calibration processing based on the waveform attenuation method, the above-described configuration enables detecting a foreign object in an early stage by performing the foreign object detection based on the Power Loss method. The power reception apparatus 401 may determine whether a foreign object is detected according to the data obtained in the calibration processing.

[Foreign Object Detection Processing in Response to Temperature Rise]

Processing for the foreign object detection performed upon detection of a temperature rise in the power transmission apparatus 402 or the power reception apparatus 401 will be described below. Causes of temperature rise in the power transmission apparatus 402 or the power reception apparatus 401 include heat generation from electric circuits including the antennas of the power transmission apparatus 402 and the power reception apparatus 401 and heat generation from the CPU that executes various processing. Also, in a case where a foreign object exists in the vicinity of the power transmission apparatus 402 and the power reception apparatus 401, the foreign object consumes part of the energy of the transmission power and generates heat. Accordingly, the power transmission apparatus 402 or the power reception apparatus 401 in contact with the foreign object may also cause a temperature rise. Therefore, in a case where the temperature of the power transmission apparatus 402 or the power reception apparatus 401 becomes higher than a predetermined threshold value, a foreign object is likely to exist in the vicinity of the power transmission apparatus 402 and the power reception apparatus 401. In this case, therefore, the power transmission apparatus 402 and the power reception apparatus 401 control the execution of the foreign object detection.

Operations performed by the power transmission apparatus 402 and the power reception apparatus 401 in a case where the power transmission apparatus 402 detects a temperature rise will be described below. The power transmission apparatus 402 includes a temperature sensor. In a case where the temperature sensor detects that the temperature of the power transmission apparatus 402 is higher than a predetermined threshold value, the power transmission apparatus 402 performs the foreign object detection based on the waveform attenuation method. Then, in a case where the power transmission apparatus 402 determines that a foreign object exists, the power transmission apparatus 402 suspends the power transmission or reduces the transmission power.

The reason why the power transmission apparatus 402 performs the foreign object detection based on the waveform attenuation method, not based on the Power Loss method, is as follows. In the Power Loss method, the power transmission apparatus 402 needs to receive the reception power value from the power reception apparatus 401. In the waveform attenuation method, the power transmission apparatus 402 does not need information from the power reception apparatus 401, which makes it possible to perform the foreign object detection in a shorter time. In addition, the foreign object detection based on the waveform attenuation method can perform the foreign object detection with higher accuracy than the Power Loss method. More specifically, in a case where a temperature rise occurs and a foreign object is likely to exist, the power transmission apparatus 402 can achieve the high-accuracy foreign object detection based on the waveform attenuation method in an early stage. However, the power transmission apparatus 402 may perform the foreign object detection based on the Power Loss method. In this case, the power transmission apparatus 402 notifies the power reception apparatus 401 that the foreign object detection based on the Power Loss method will be performed. Upon reception of the notification, the power reception apparatus 401 transmits the command for performing the foreign object detection based on the Power Loss method including the reception power value measured by the power reception apparatus 401, to the power transmission apparatus 402.

Operations performed by the power transmission apparatus 402 and the power reception apparatus 401 in a case where the power reception apparatus 401 detected a temperature rise will be described below. The power reception apparatus 401 includes a temperature sensor. In a case where the temperature sensor detects that the temperature of the power reception apparatus 401 is higher than a predetermined threshold value, the power reception apparatus 401 transmits the command for performing the foreign object detection based on the waveform attenuation method, to the power transmission apparatus 402. Then, the power transmission apparatus 402 performs the foreign object detection based on the waveform attenuation method. In a case where the power transmission apparatus 402 determines that a foreign object exists, the power transmission apparatus 402 suspends the power transmission or reduce the transmission power. The power transmission apparatus 402 may perform the foreign object detection based on the Power Loss method instead of the waveform attenuation method. In this case, upon detection of temperature information by the temperature sensor, the power reception apparatus 401 transmits the command for performing the foreign object detection based on the Power Loss method to the power transmission apparatus 402.

Predetermined rated values for allowable temperatures of power transmission and power reception apparatuses may be prescribed in standards and laws of each country. Therefore, a threshold value for determining the execution of the above-described foreign object detection is set to a value lower than these rated values. Thus, even in a case where a temperature rise by a foreign object occurs, the foreign object can be detected in an early stage before the temperature reaches a rated value.

[Foreign Object Detection Processing According to Transmission Power]

The foreign object detection processing performed based on the method selected according to the transmission power transmitted from the power transmission apparatus 402 will be described below. As described above, the foreign object detection based on the Power Loss method is performed based on the loss of the transmission power during the power transmission from the power transmission apparatus 402 to the power reception apparatus 401. This method has a disadvantage that the accuracy in the foreign object detection decreases while the power transmission apparatus 402 is transmitting large power. On the other hand, the method has an advantage that the high power transmission efficiency can be maintained because the foreign object detection can be performed while power is transmitted. The waveform attenuation method has another disadvantage that the power transmission efficiency decreases when the power transmission is suspended. This is because the method observes an attenuation factor of a transmission power waveform to perform the foreign object detection while the power transmission apparatus 402 suspends the power transmission. On the other hand, the method has another advantage that the foreign object detection can be performed with high accuracy even during large power transmission.

Therefore, in a case where the transmission power value from the power transmission apparatus 402 is less than a predetermined threshold value, the power transmission apparatus 402 and the power reception apparatus 401 perform control to execute only the foreign object detection based on the Power Loss method. This is because, in case of the low transmission power, even the foreign object detection based on the Power Loss method provides high accuracy and hence the Power Loss method maintaining the high power transmission efficiency is advantageous. Meanwhile, in a case where the transmission power from the power transmission apparatus 402 is equal to or larger than a predetermined threshold value, the power transmission apparatus 402 and the power reception apparatus 401 performs control to execute the foreign object detection based on both the Power Loss method and the waveform attenuation method or execute only the foreign object detection based on the waveform attenuation method. This is because, in case of the high transmission power, the foreign object detection based on the Power Loss method provides the low accuracy of the foreign object detection and hence the foreign object detection based on the waveform attenuation method providing the high accuracy of the foreign object detection is advantageous. Suitably using a plurality of foreign object detection methods according to the transmission power in this way enables improving the accuracy of the foreign object detection while maintaining the high power transmission efficiency.

The foreign object detection processing in response to a communication error, the foreign object detection processing in response to the power reduction, the foreign object detection processing according to the calibration data, and the foreign object detection processing according to the temperature information have been described above centering on a case where both the Power Loss method and the waveform attenuation methods are used. However, in a case where the transmission power is lower than a predetermined threshold value, in these exemplary embodiments, the foreign object detection based on the Power Loss method may be performed at the timing when the foreign object detection based on the waveform attenuation method is performed. In a case where the transmission power is equal to or larger than a predetermined threshold value, the exemplary embodiments may use both the Power Loss method and the waveform attenuation methods or perform the foreign object detection based on waveform attenuation method at the timing when the foreign object detection based on the Power Loss method is performed.

The present exemplary embodiment has been described above centering on a case where the wireless power transmission system determines whether a predetermined condition related to a state of at least either one of the power transmission apparatus 402 and the power reception apparatus 401 is satisfied, and, according to the determination result, selectively uses the Power Loss method and the waveform attenuation method. However, the present invention is not limited thereto. At least either one of the power transmission apparatus 402 and the power reception apparatus 401 may suitably use a plurality of foreign object detection methods including foreign object detection methods other than the above according to a condition. The wireless power transmission system may control the selection of foreign object detection methods and the execution of the foreign object detection processing through the combination of a plurality of conditions including the above-described various conditions and other conditions.

According to various embodiments of the present disclosure, it is possible to suitably control the detection processing in a case where a plurality of detection methods for detecting an object different from the power reception apparatus is available in performing the wireless power transmission.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-063780, filed Mar. 31, 2020, which is hereby incorporated by reference herein in its entirety.

What is claimed is:

1. A power transmission apparatus comprising:
   a power transmission unit configured to wirelessly transmit power to a power reception apparatus;
   a first detection unit configured to perform detection processing using a first detection method for detecting an object different from the power reception apparatus based on a power loss related to a power transmission by the power transmission unit, the power loss representing a difference between the power which is transmitted by the power transmission apparatus and the power which is received by the power reception apparatus; and a second detection unit configured to perform detection processing using a second detection method for detecting an object different from the power reception apparatus based on at least either one of a voltage attenuation state and a current attenuation state related to the power transmission by the power transmission unit, in a case where a condition related to the state of at least either one of the power reception apparatus and the power transmission apparatus is satisfied, the voltage attenuation state being determined based on voltages of the power transmission unit measured at two different timings in a power transmission restriction period where the power transmission by the power transmission unit is restricted and the current attenuation state being determined based on currents of the power transmission unit measured at two different timings in the power transmission restriction period.

2. The power transmission apparatus according to claim 1, wherein the condition includes at least one of a condition related to accuracy of detecting the object using the first detection method and a condition related to likelihood that the object exists.

3. The power transmission apparatus according to claim 1, wherein the condition includes a condition that a communication error has occurred in at least one of the power transmission apparatus and the power reception apparatus, and wherein, in a case where the condition is satisfied, the second detection unit performs the detection processing using the second detection method.

4. The power transmission apparatus according to claim 1, wherein the condition includes a condition that a reception power value of the power reception apparatus corresponding to the power transmission by the power transmission apparatus is less than a threshold value, and wherein, in a case where the condition is satisfied, the second detection unit performs the detection processing using the second detection method.

5. The power transmission apparatus according to claim 1, wherein the condition includes a condition that, in a combination of a transmission power value of the power transmission apparatus acquired as reference data for the first detection method and a reception power value of the power reception apparatus corresponding to the power transmission by the power transmission apparatus, the reception power value is not included in a range determined according to the transmission power value, and wherein, in a case where the condition is satisfied, the second detection unit performs the detection processing using the second detection method.

6. The power transmission apparatus according to claim 5, wherein the condition includes whether at least either one of the voltage attenuation state and the current attenuation state, which are related to the power transmission by the power transmission unit, acquired as reference data for the second detection method is outside of a range of the attenuation state, and wherein, in a case where the attenuation state is outside of the range, the first detection unit performs the detection processing using the first detection method.

7. The power transmission apparatus according to claim 1, wherein the condition includes a condition that the temperature is equal to or higher than a threshold value in at least either one of the power transmission apparatus and the power reception apparatus, and wherein, in a case where the condition is satisfied, the second detection unit performs the detection processing using the second detection method.

8. The power transmission apparatus according to claim 1, wherein the condition includes a condition that the transmission power value of the power transmission apparatus is equal to or larger than a threshold value, and wherein, in a case where the condition is satisfied, the second detection unit performs the detection processing using the second detection method.

9. The power transmission apparatus according to claim 8, wherein, in a case where the condition is not satisfied, the first detection unit performs the detection processing using the first detection method, and the second detection unit does not perform the detection processing using the second detection method.

10. The power transmission apparatus according to claim 1, wherein, in the first detection method, it is determined that an object different from the power reception apparatus exists in a case where a power loss based on the transmission power value of the power transmission apparatus and the reception power value of the power reception apparatus corresponding to the power transmission by the power transmission apparatus is larger than a threshold value.

11. The power transmission apparatus according to claim 1, wherein, in the second detection method, it is determined that the object exists in a case where an attenuation factor of an amplitude of at least either one of a voltage waveform related to power transmission, a current waveform related to power transmission, a voltage waveform related to power reception, and a current waveform related to power reception in the power transmission restriction period in the power transmission apparatus transmitting power is larger than a threshold value.

12. The power transmission apparatus according to claim 1, wherein the power transmission unit transmits power to the power reception apparatus according to the Wireless Power Consortium (WPC) standard.

13. The power transmission apparatus according to claim 1, further comprising a determination unit configured to determine whether the condition related to the state of at least either one of the power reception apparatus and the power transmission apparatus is satisfied.

14. A power reception apparatus comprising:

a power reception unit configured to receive power wirelessly transmitted from a power transmission apparatus;

a first request unit configured to request the power transmission apparatus to perform detection processing using a first detection method for detecting an object, different from the power reception apparatus, based on a power loss related to a power transmission from the power transmission apparatus, the power loss representing a difference between the power which is transmitted by the power transmission apparatus and the power which is received by the power reception apparatus; and a second request unit configured to request the power transmission apparatus to perform detection processing using a second detection method for detecting an object different from the power reception apparatus based on at least either one of a voltage attenuation state and a current attenuation state related to power transmission from the power transmission apparatus, in a case where a condition related to the state of at least either one of the power reception apparatus and the power transmission apparatus is satisfied, the voltage attenuation state being determined based on voltages of the power transmission unit measured at two different timings in a power transmission restriction period where the power transmission by the power transmission unit is restricted and the current attenuation state being determined based on currents of the power transmission unit measured at two different timings in the power transmission restriction period.

15. The power reception apparatus according to claim 14, wherein the condition includes at least one of a condition related to accuracy of detecting the object based on the first detection method and a condition related to likelihood that the object exists.

16. The power reception apparatus according to claim 14, further comprising a determination unit configured to determine whether the condition related to the state of at least either one of the power reception apparatus and the power transmission apparatus is satisfied.

17. A method for controlling a wireless power transmission system having a power transmission apparatus and a power reception apparatus, the method comprising:
   transmitting power, as a power transmission, wirelessly from the power transmission apparatus to the power reception apparatus;
   performing a first detection processing using a first detection method for detecting an object different from the power reception apparatus, based on a power loss related to the power transmission from the power transmission apparatus to the power reception apparatus, the power loss representing a difference between the power which is transmitted by the power transmission apparatus and the power which is received by the power reception apparatus; and
   performing a second detection processing using a second detection method for detecting an object different from the power reception apparatus based on at least either one of a voltage attenuation state and a current attenuation state related to the power transmission in the power transmission, in a case where a condition related to the state of at least either one of the power reception apparatus and the power transmission apparatus is satisfied, the voltage attenuation state being determined based on voltages of the power transmission unit measured at two different timings in a power transmission restriction period where the power transmission by the power transmission unit is restricted, and the current attenuation state being determined based on currents of the power transmission unit measured at two different timings in the power transmission restriction period.

18. The control method according to claim 17, wherein the condition includes at least either one of a condition related to accuracy of detecting the object based on the first detection method and a condition related to likelihood that the object exists.

19. A non-transitory computer-readable storage medium storing a program for causing a computer to execute a method, the method comprising:
   transmitting power, as a power transmission, wirelessly from the power transmission apparatus to the power reception apparatus;
   performing a first detection processing using a first detection method for detecting an object different from the power reception apparatus, based on a power loss related to the power transmission from the power transmission apparatus to the power reception apparatus, the power loss representing a difference between the power which is transmitted by the power transmission apparatus and the power which is received by the power reception apparatus; and
   performing a second detection processing using a second detection method for detecting an object different from the power reception apparatus based on at least either one of a voltage attenuation state and a current attenuation state related to the power transmission in the power transmission, in a case where a condition related to the state of at least either one of the power reception apparatus and the power transmission apparatus is satisfied, the voltage attenuation state being determined based on voltages of the power transmission unit measured at two different timings in a power transmission restriction period where the power transmission by the power transmission unit is restricted, and the current attenuation state being determined based on currents of the power transmission unit measured at two different timings in the power transmission restriction period.

\* \* \* \* \*